United States Patent
Sugimoto

(10) Patent No.: US 7,569,806 B2
(45) Date of Patent: Aug. 4, 2009

(54) MOVING OBJECT DETECTION PHOTOINTERRUPTER HAVING A DETERMINATION OF PASSING OF THE MOVING OBJECT BASED ON ITS PASSING DIRECTION AND THE DETECTION INFORMATION OF THE NEXT MOVING OBJECT AND ELECTRIC DEVICE USING THE SAME

(75) Inventor: Kohichiroh Sugimoto, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 69 days.

(21) Appl. No.: 11/905,801

(22) Filed: Oct. 4, 2007

(65) Prior Publication Data

US 2008/0083888 A1 Apr. 10, 2008

(30) Foreign Application Priority Data

Oct. 5, 2006 (JP) ............................... 2006-274217
Dec. 12, 2006 (JP) ............................... 2006-334839

(51) Int. Cl.
*H01J 40/14* (2006.01)

(52) U.S. Cl. .................................. 250/221; 250/223 R

(58) Field of Classification Search .................. 250/221, 250/559.4, 223 R, 559.44; 377/6, 10; 340/555–557, 340/567, 545.1, 545.8

See application file for complete search history.

(56) References Cited

U.S. PATENT DOCUMENTS 5,427,444 A * 6/1995 Griesemer .................. 312/201

FOREIGN PATENT DOCUMENTS

| JP | 2001-318164 A | 11/2001 |
| JP | 2006-71621 A | 3/2006 |
| JP | 2006-136410 A | 6/2006 |

* cited by examiner

*Primary Examiner*—Que T Le
(74) *Attorney, Agent, or Firm*—Birch, Stewart, Kolasch & Birch, LLP

(57) ABSTRACT

An embodiment of the present invention comprises: at least one light-emitting portion that emits light; a plurality of light-receiving portions, disposed at intervals in the passing direction of the moving object, that receive and detect light emitted from the light-emitting portion and reflected by the moving object; a holding portion that holds information indicating the passing direction of the moving object corresponding to a change in the detection outputs of the light-receiving portions occurring when the light-receiving portions receive the light reflected by the moving object; and a determination portion that determines the passing of the moving object based on the passing direction of the moving object as held by the holding portion and the detection outputs of the light-receiving portions occurring when the light-receiving portions receive the light reflected by the next moving object.

12 Claims, 12 Drawing Sheets

FIG.8 Passing in Forward Direction

Rebound (1)

Rebound (3)

MOVING OBJECT DETECTION PHOTOINTERRUPTER HAVING A DETERMINATION OF PASSING OF THE MOVING OBJECT BASED ON ITS PASSING DIRECTION AND THE DETECTION INFORMATION OF THE NEXT MOVING OBJECT AND ELECTRIC DEVICE USING THE SAME

BACKGROUND OF THE INVENTION

This application claims priority under 35 U.S.C. § 119(a) on Japanese Patent Application No. 2006-274217, filed Oct. 5, 2006, and on Japanese Patent Application No. 2006-334839, filed Dec. 12, 2006, the contents of which are incorporated herein by reference in their entirety.

The present invention relates to a moving object detection photointerrupter for detecting a moving object, and to an electric device using the same.

Reflective types and transmissive types exist as conventional photointerrupter devices. With the former, or the reflective type, light from a light-emitting element is outputted into the path through which a moving object travels, the light reflected by the moving object is received by a light-receiving element, and the moving object is detected based on a change in the detection output of the light-receiving element at the time of receiving the reflected light. With the latter, or the transmissive type, light outputted from a light-emitting element is received by a light-receiving element via the path of a moving object, and the moving object is detected based on a change in the detection output of the light-receiving element at the time of the light being interrupted by the moving object (refer to JP 2006-71621A and JP2006-136410).

In addition, JP 2006-71621A and JP 2006-136410A disclose a transmissive type device that detects unidirectional movement of a moving object, a medal, or the like. In these devices, plural light receivers are disposed in proximity to one another in the path of the moving object, the medal, or the like. Movement of the moving object, the medal, or the like is detected, and the number of the moving object, the medal, or the like is counted, based on a change in the detection output of each light receiver when the incoming light is interrupted by the moving object, the medal, or the like. Additionally, movement of the moving object, the medal, or the like in the reverse direction is detected as an error.

Furthermore, JP 2001-318164A discloses a transmissive type device that detects movement of an orb. Here, light from light-emitting elements passes into light-receiving elements via the path of the orb. Movement of the orb is detected, and the number of orbs is counted, based on a change in the detection output of each light-receiving element when the incoming light is interrupted by the orb. When only the incoming light of light-receiving elements located downstream in the movement direction is interrupted, the orb is judged to have rebounded, which prevents erroneous detection.

However, with the technology disclosed in JP 2006-71621A and JP 2006-136410A, although movement of the moving object, the medal, or the like in the reverse direction is detected as an error, there are nevertheless mistakes in counting the number of the moving object, the medal, or the like in such cases. For example, when a moving object, a medal, or the like moves and passes in the forward direction, rebounds and passes in the reverse direction, and then once again passes in the forward direction, the same moving object, medal, or the like is counted twice, and thus errors arise in the count value.

Also, with the technology disclosed in JP 2001-318164A, when only the incoming light of light-receiving elements located downstream in the movement direction is interrupted, the orb is judged to have rebounded, and erroneous detection is prevented thereby; however, when the orb once again passes in front of the light-receiving elements in the forward direction after having moved in front of the light-receiving elements in the reverse direction, the same orb is counted twice, and thus errors arise in the count value.

SUMMARY OF THE INVENTION

Accordingly, the present invention has been conceived in light of the abovementioned conventional problems, and it is an object thereof to provide a moving object detection photointerrupter and an electric device using the same capable of accurately determining the passage of a moving object, accurately counting moving objects, and appropriately determining the occurrence of errors, even when an abnormal operation such as a rebound occurs and regardless of the distance of the rebound occurring at this time.

To solve the abovementioned problems, a moving object detection photointerrupter according to the present invention sequentially detects the passing of a plurality of moving objects, and comprises: at least one light-emitting portion that emits light; a plurality of light-receiving portions, disposed at intervals in the passing direction of the moving object, that receive and detect light emitted from the light-emitting portion and reflected by the moving object; a holding portion that holds information indicating the passing direction of the moving object corresponding to a change in the detection outputs of the light-receiving portions occurring when the light-receiving portions receive the light reflected by the moving object; and a determination portion that determines the passing of the moving object based on the passing direction of the moving object as held by the holding portion and the detection outputs of the light-receiving portions occurring when the light-receiving portions receive the light reflected by the next moving object.

In addition, a moving object detection photointerrupter according to the present invention sequentially detects the passing of a plurality of moving objects, and comprises: at least one light-emitting portion that emits light; a plurality of light-receiving portions, disposed at intervals in the passing direction of the moving object, that receive and detect light emitted from the light-emitting portion via the path of passing of the moving object; a holding portion that holds information indicating the passing direction of the moving object corresponding to a change in the detection outputs of the light-receiving portions occurring when the moving object passes through the path of passing; and a determination portion that determines the passing of the moving object based on the passing direction of the moving object as held by the holding portion and the detection outputs of the light-receiving portions occurring when the moving object passes through the path of passing.

For example, when the passing direction of the moving object as held by the holding portion is the forward direction, and the passing direction of the next moving object corresponding to the detection outputs of the light-receiving portions is the forward direction, the determination portion determines that the next moving object has passed.

In addition, when the passing direction of the moving object as held by the holding portion is the reverse direction, the determination portion determines that the moving object has not passed.

Alternatively, when the passing direction of the moving object as held by the holding portion is the reverse direction, the determination portion determines that the next moving object has not passed, even if the passing direction of the next moving object corresponding to a change in the detection outputs of the light-receiving portions is the forward direction.

Furthermore, when the moving object has been detected by the light-receiving portion on the exit side of the forward direction and has not been detected by a light-receiving portion on the entry side, the determination portion determines that the moving object has not passed, and outputs an error signal or holds the signal indicating the determination.

In addition, when the moving object has been detected by the light-receiving portion on the entry side of the forward direction and has not been detected by the light-receiving portion on the exit side, the holding portion holds the forward direction as the passing direction of the moving object, and when the passing direction of the moving object as held by the holding portion is the forward direction, and the passing direction of the next moving object corresponding to a change in the detection outputs of the light-receiving portions is the forward direction, the determination portion determines that the next moving object has passed.

Furthermore, when the outputs of the light reception performed by the light-receiving portions change simultaneously, the determination portion outputs an error signal or holds the signal indicating the determination.

In addition, after outputting an error signal or holding the signal indicating the determination, the determination portion stops the output of the error signal when the passing direction of the moving object corresponding to a change in the detection outputs of the light-receiving portions becomes the forward direction.

Furthermore, the moving object detection photointerrupter further comprises a synchronization detection portion that validates the detection outputs of the light-receiving portions when the light emission timing of the light-emitting portion and the light receiving timing of the light-receiving portions match plural times in a row.

In addition, the synchronization detection portion invalidates the detection outputs of the light-receiving portions when the light emission timing of the light-emitting portion and the light receiving timing of the light-receiving portions do not match.

Further still, there is only one light-emitting portion, and the light-receiving portions receive the light from the light-emitting portion together.

The electric device according to the present invention uses the aforementioned moving object detection photointerrupter according to the present invention.

The moving object detection photointerrupter according to the present invention is a reflective type, in which the light-emitting portion emits light, and the light reflected by the moving object is received and detected by the light-receiving portions, or is a transmissive type, in which the light from the light-emitting portion is received and detected by the light-receiving portions via the path of passing of the moving object. In both of these, the light-receiving portions are disposed at intervals in the passing direction of the moving object, and thus it is possible to detect the passing direction of the moving object based on a change in the detection outputs of the light-receiving portions. In addition, the passing direction of the moving object corresponding to a change in the detection output of the light-receiving portions occurring when the moving object passes is held, and the passing of the moving object is determined based on the passing direction of the present moving object and the detection output of the light-receiving portions when the light-receiving portions receive the light reflected by the next moving object. In other words, the passing of the moving object is determined not only by referring to the detection outputs of the light-receiving portions but also by holding and referring to the passing direction of the previous moving object. Through this, the passage of a moving object can be accurately determined, moving objects can be accurately counted, and the occurrence of errors can be appropriately determined, even when an abnormal operation such as a rebound occurs and regardless of the distance of the rebound occurring at this time.

For example, when the passing direction of the previous moving object is the forward direction, and the passing direction of the next moving object is the forward direction, the next moving object is determined to have passed.

In addition, when the passing direction of the moving object is the reverse direction, the moving object is assumed to have rebounded in the reverse direction after passing through, and it is thus determined that the moving object has not passed.

Alternatively, when the passing direction of a moving object is the reverse direction and the passing direction of the next moving object is the forward direction, the moving object is assumed to have once again passed through in the forward direction after rebounding in the reverse direction, and it is thus determined that the moving object has not passed.

Furthermore, when the moving object has been detected by the light-receiving portion on the exit side of the forward direction and has not been detected by the light-receiving portion on the entry side, it is determined that the moving object has not passed, and an error signal is outputted or the signal indicating the determination is held, providing notification of an error.

In addition, when the moving object has been detected by the light-receiving portion on the entry side of the forward direction and has not been detected by the light-receiving portion on the exit side, the forward direction is held as the passing direction of the moving object, and when the passing direction of the next moving object is the forward direction, the next moving object is determined to have passed.

Furthermore, when the light-receiving outputs of the light-receiving portions change simultaneously, an error is determined to have occurred, and after this, when the passing direction of the moving object corresponding to change in the detection outputs of the light-receiving portions becomes the forward direction, the error is determined to have been solved. Because the light-receiving portions are disposed at intervals in the passing direction of the moving object, the detection outputs of the light-receiving portions change sequentially along with the movement of the moving object. Therefore, when the light-receiving outputs of the light-receiving portions change simultaneously, it can be assumed that an error has occurred. For example, there are situations where the light-receiving outputs of the light-receiving portions change simultaneously due to the entering of ambient light. When the passing direction of the moving object corresponding to the detection outputs of the light-receiving portions becomes the forward direction, the detection outputs of the light-receiving portions have returned to normal, and thus it can be assumed that the error has been solved.

Furthermore, the detection outputs of the light-receiving portions are validated when the light emission timing of the light-emitting portion and the light receiving timing of the light-receiving portions match plural times in a row. Also, the detection outputs of the light-receiving portions are invalidated when the light emission timing of the light-emitting portion and the light receiving timing of the light-receiving portions do not match. Through this, it is possible to invalidate detection outputs of the light-receiving portions due to the entering of ambient light, and validate only detection outputs of the light-receiving portions due to the entering of light from the light-emitting portion; thus it is possible to more accurately determine the passing direction of the moving object and the passing of the moving object.

In addition, there is only one light-emitting portion, and the light-receiving portions receive the light from the light-emitting portion together. While the same number of light-emitting portions as light-receiving portions may be provided, including just a single light-emitting portion makes it possible to reduce the number of components and simplify the configuration.

An electric device according to the present invention uses the aforementioned moving object detection photointerrupter according to the present invention, and thus has the same operations and effects as the aforementioned moving object detection photointerrupter according to the present invention.

DESCRIPTION OF THE PREFERRED EMBODIMENT

Hereinafter, an embodiment of the present invention shall be described in detail with reference to the appended drawings.

Figure 1:
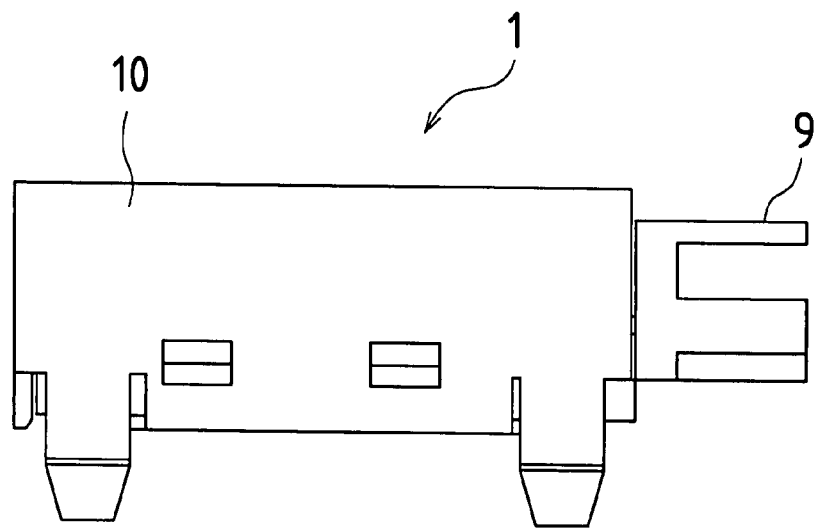
FIG. 1 is a side view illustrating an embodiment of a moving object detection photointerrupter according to the present invention.
Figure 2:
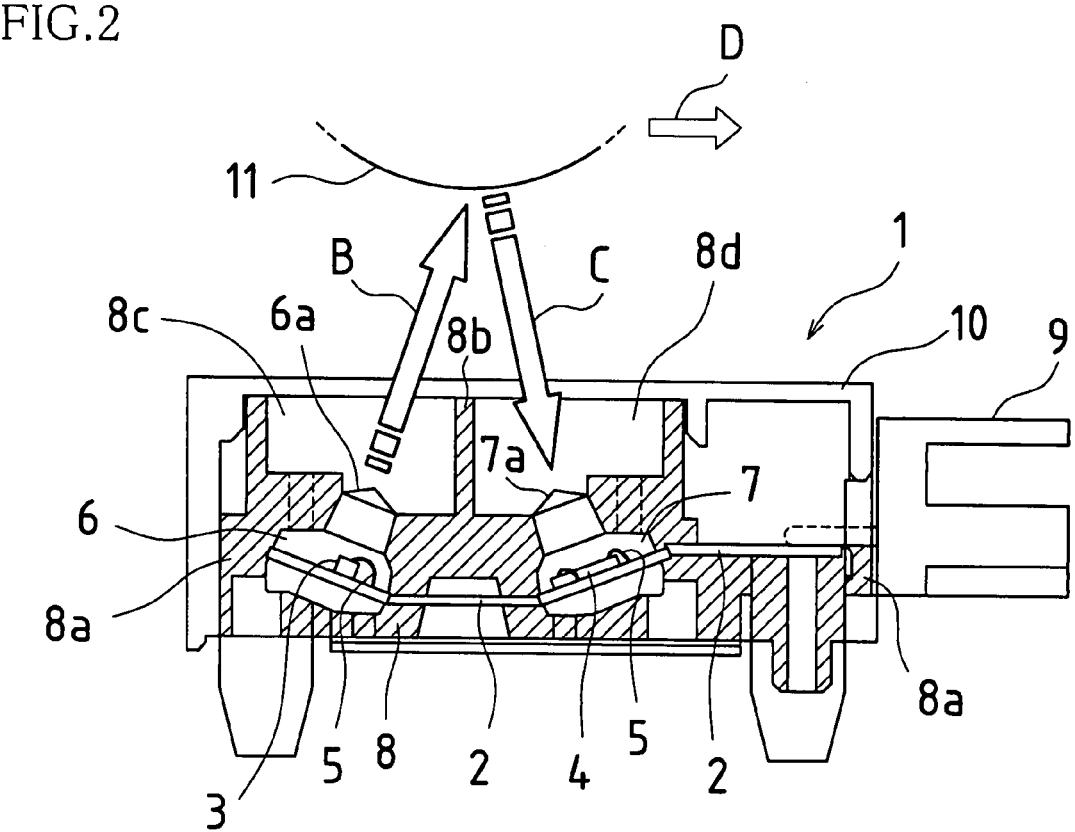
FIG. 2 is a cross-section of the moving object detection photointerrupter of FIG. 1.
Figure 3:
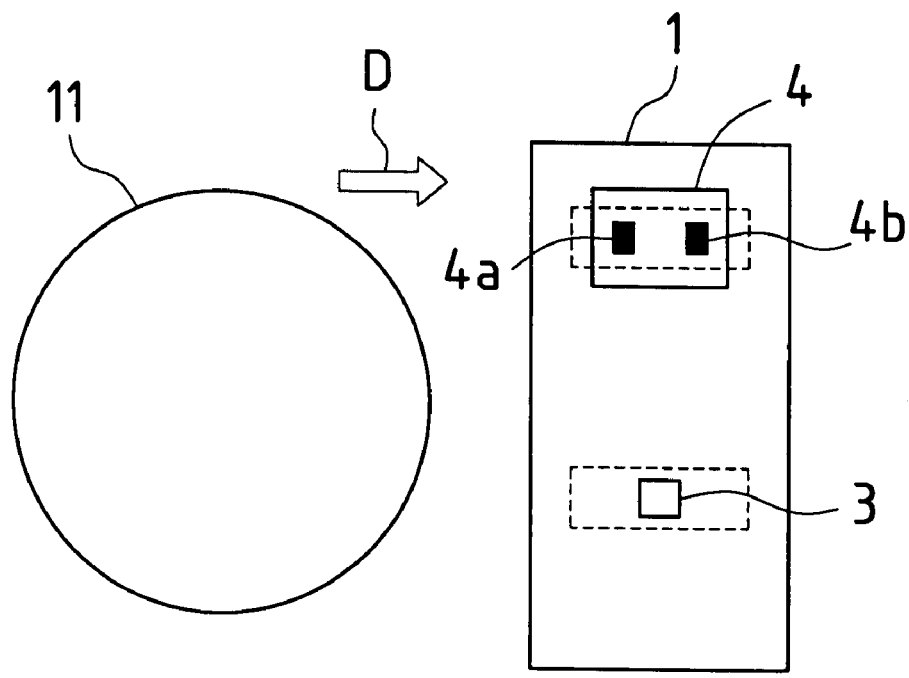
FIG. 3 is a plan view illustrating the moving object detection photointerrupter of FIG. 1.

FIGS. 1, 2, and 3 are a side view, cross-section, and plane view, respectively, illustrating an embodiment of the moving object detection photointerrupter of the present invention. In the moving object detection photointerrupter 1 of the present embodiment, a light-emitting element 3 and a light-receiving chip 4 are provided on a lead frame 2, and the light-emitting element 3 and light-receiving chip 4 are wired and connected to the lead frame 2 and the like through respective wires 5. Translucent resins 6 and 7 are formed through molding and the light-emitting element 3 and light-receiving chip 4 are sealed within the translucent resins 6 and 7 respectively. Furthermore, a light-blocking resin case 8 is formed through molding and the translucent resins 6 and 7 are sealed within the light-blocking resin case 8. The lead frame 2, light-emitting element 3, light-receiving chip 4, and so on are integrated into a single body through the light-blocking resin case 8. Furthermore, a connector 9 is fixed to a side wall 8a on one side of the light-blocking resin case 8, and the light-blocking resin case 8 is covered with a translucent resin cover 10, which is fixed thereto.

The light-blocking resin case 8 surrounds the light-emitting element 3 and light-receiving chip 4 by the side walls 8a on the four sides, and the light-emitting element 3 and light-receiving chip 4 are blocked off from one another by a partition wall 8b. The light-emitting element 3 and light-receiving chip 4 are disposed within respective compartments 8c and 8d of the light-blocking resin case 8; thus light emitted from the light-emitting element 3 does not directly enter first and second light-receiving elements 4a and 4b of the light-receiving chip 4, and it is also difficult for ambient light to enter the first and second light-receiving elements 4a and 4b of the light-receiving chip 4.

The end portions of the translucent resins 6 and 7 form collimate lenses 6a and 7a, respectively. Light emitted from the light-emitting element 3 is emitted in the direction of the arrow B, passing through the collimate lens 6a of the translucent resin 6 and the translucent resin cover 10.

The first and second light-receiving elements 4a and 4b are provided in the light-receiving chip 4. When a moving object 11 moves in front of the moving object detection photointerrupter 1, the light emitted from the light-emitting element 3 is reflected by the moving object 11 in the direction of the arrow C. This reflected light passes through the translucent resin cover 10 and the collimate lens 7a of the translucent resin 7 and enters into at least one of the first and second light-receiving elements 4a and 4b of the light-receiving chip 4. When the moving object 11 is not present in front of the moving object detection photointerrupter 1, the light emitted from the light-emitting element 3 is not reflected by the moving object 11 and thus does not enter into the light-receiving chip 4.

The collimate lens 6a converges and emits the light from the light-emitting element 3, whereas the collimate lens 7a converges the light reflected by the moving object 11 and causes the light to enter the light-receiving chip 4. When the light from the light-emitting element 3 is converged by the collimate lens 6a, the range of the light emitted from the light-emitting element 3 narrows, and a light figure appears, small and bright, on the moving object 11. Furthermore, when the light reflected by the moving object 11 is converged by the collimate lens 7a, the light figure on the moving object 11 appears, small and bright, on the light-receiving chip 4 or in the vicinity thereof. For this reason, the first and second light-receiving elements 4a and 4b of the light-receiving chip 4 undergo distinct changes in their detection outputs when the light emitted from the light-emitting element 3 and reflected by the moving object 11 enters the light-receiving elements 4a and 4b and when this light does not enter the light-receiving elements 4a and 4b. Accordingly, this light can be detected with certainty.

The optical properties of the collimate lenses 6a and 7a are set in accordance with the dimensions of the light-receiving areas of the first and second light-receiving elements 4a and 4b of the light-receiving chip 4, and are configured so that a sufficient amount of the light reflected by the moving object 11 enters the light-receiving areas of the first and second light-receiving elements 4a and 4b of the light-receiving chip 4 with certainty.

In addition, the dimensions of the light-receiving areas of the first and second light-receiving elements 4a and 4b are identical, and thus the first and second light-receiving elements 4a and 4b output the same level of detection output when receiving the same amounts of light.

Figure 4:
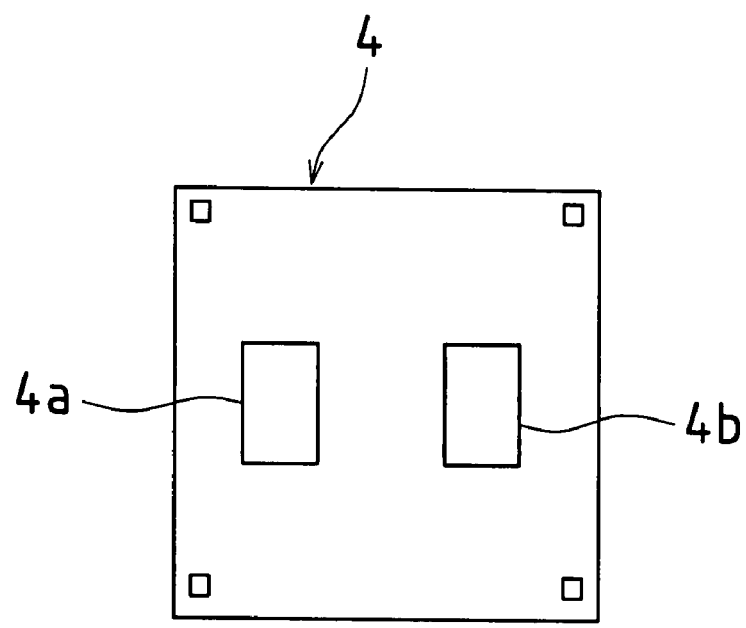
FIG. 4 is a plan view illustrating a light-receiving chip included in the moving object detection photointerrupter of FIG. 1.

Here, the first and second light-receiving elements 4a and 4b of the light-receiving chip 4 are parallel to one another on the light-receiving chip 4, as shown in FIG. 4, and are disposed along a forward direction D of the moving object 11, as shown in FIG. 3.

As shown in FIGS. 2 and 3, when the moving object 11 moves in the forward direction D, the moving object 11 first reaches the front of the first light-receiving element 4a of the light-receiving chip 4, and subsequently reaches the front of the second light-receiving element 4b of the light-receiving chip 4. Accordingly, the light emitted from the light-emitting element 3 is first reflected by the moving object 11 that has reached the front of the first light-receiving element 4a and enters into the first light-receiving element 4a; after this, the light is reflected by the moving object 11 that has reached the front of the second light-receiving element 4b and enters into the second light-receiving element 4b.

Furthermore, the moving object 11 moves past the front of the first light-receiving element 4a of the light-receiving chip 4, and subsequently moves past the front of the second light-receiving element 4b of the light-receiving chip 4. Accordingly, first, the light reflected by the moving object 11 and entering into the first light-receiving element 4a disappears, and next, the light reflected by the moving object 11 and entering into the second light-receiving element 4b disappears.

Figure 5:
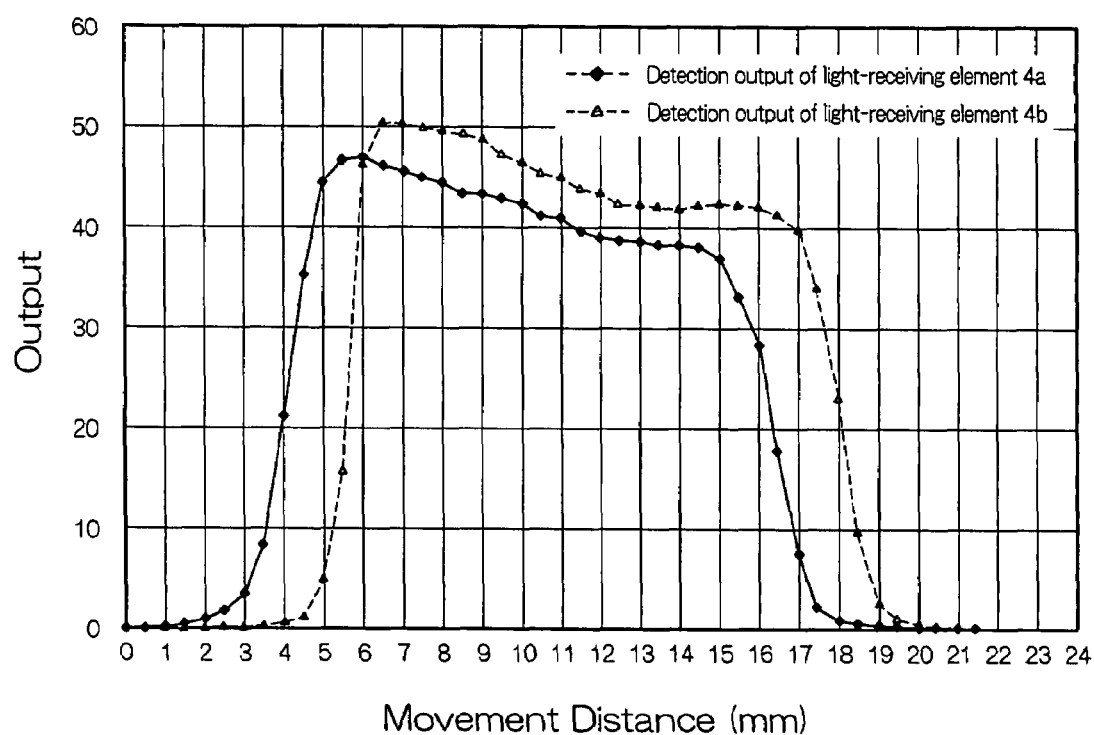
FIG. 5 is a graph illustrating change in the detection output of each light-receiving element when a moving object moves in front of the moving object detection photointerrupter of FIG. 1.

FIG. 5 is a graph illustrating change in the detection output of the first and second light-receiving elements 4a and 4b of the light-receiving chip 4 when the moving object 11 passes in front of the moving object detection photointerrupter 1 while moving in the forward direction D. Referring to the graph in FIG. 5, when the moving object 11 has approached the front of the moving object detection photointerrupter 1, first, the detection output of the first light-receiving element 4a rises due to the light reflected by the moving object 11 entering into the first light-receiving element 4a, and then, the detection output of the second light-receiving element 4b rises due to the light reflected by the moving object 11 entering into the second light-receiving element 4b.

Then, as the moving object 11 passes by and moves away from the front of the moving object detection photointerrupter 1, first, the detection output of the first light-receiving element 4a drops due to the light reflected by the moving object 11 ceasing to enter into the first light-receiving element 4a, and then, the detection output of the second light-receiving element 4b drops due to the light reflected by the moving object 11 ceasing to enter into the second light-receiving element 4b.

It should be noted that in the case where the moving object 11 moves in the direction opposite the forward direction D, the moving object 11 first passes in front of the second light-receiving element 4b of the light-receiving chip 4, and then passes in front of the first light-receiving element 4a of the light-receiving chip 4. Thus, the detection output of first light-receiving element 4a rises after the detection output of the second light-receiving element 4b rises, and furthermore, the detection output of first light-receiving element 4a drops after the detection output of the second light-receiving element 4b drops.

Therefore, it is possible to detect movement and the passing direction of the moving object 11 by monitoring changes in the detection output of the first and second light-receiving elements 4a and 4b of the light-receiving chip 4.

Furthermore, as described earlier, the collimate lenses 6a and 7a have an effect of causing the detection outputs of the first and second light-receiving elements 4a and 4b of the light-receiving chip 4 to undergo distinct changes when the light emitted from the light-emitting element 3 and reflected by the moving object 11 enters the light-receiving elements 4a and 4b and when this light does not enter the light-receiving elements 4a and 4b. Through this, the accuracy of the detection of the movement and passing direction of the moving object 11 based on changes in the detection output of the first and second light-receiving elements 4a and 4b is improved, and detection is made easy.

Furthermore, the optical properties of the collimate lenses 6a and 7a are set in accordance with the dimensions of the light-receiving areas of the first and second light-receiving elements 4a and 4b of the light-receiving chip 4, and the light-receiving areas of the first and second light-receiving elements 4a and 4b have the same dimensions; through this, the accuracy of the detection of the movement and passing direction of the moving object 11 is improved, and detection is made easy.

Figure 6:
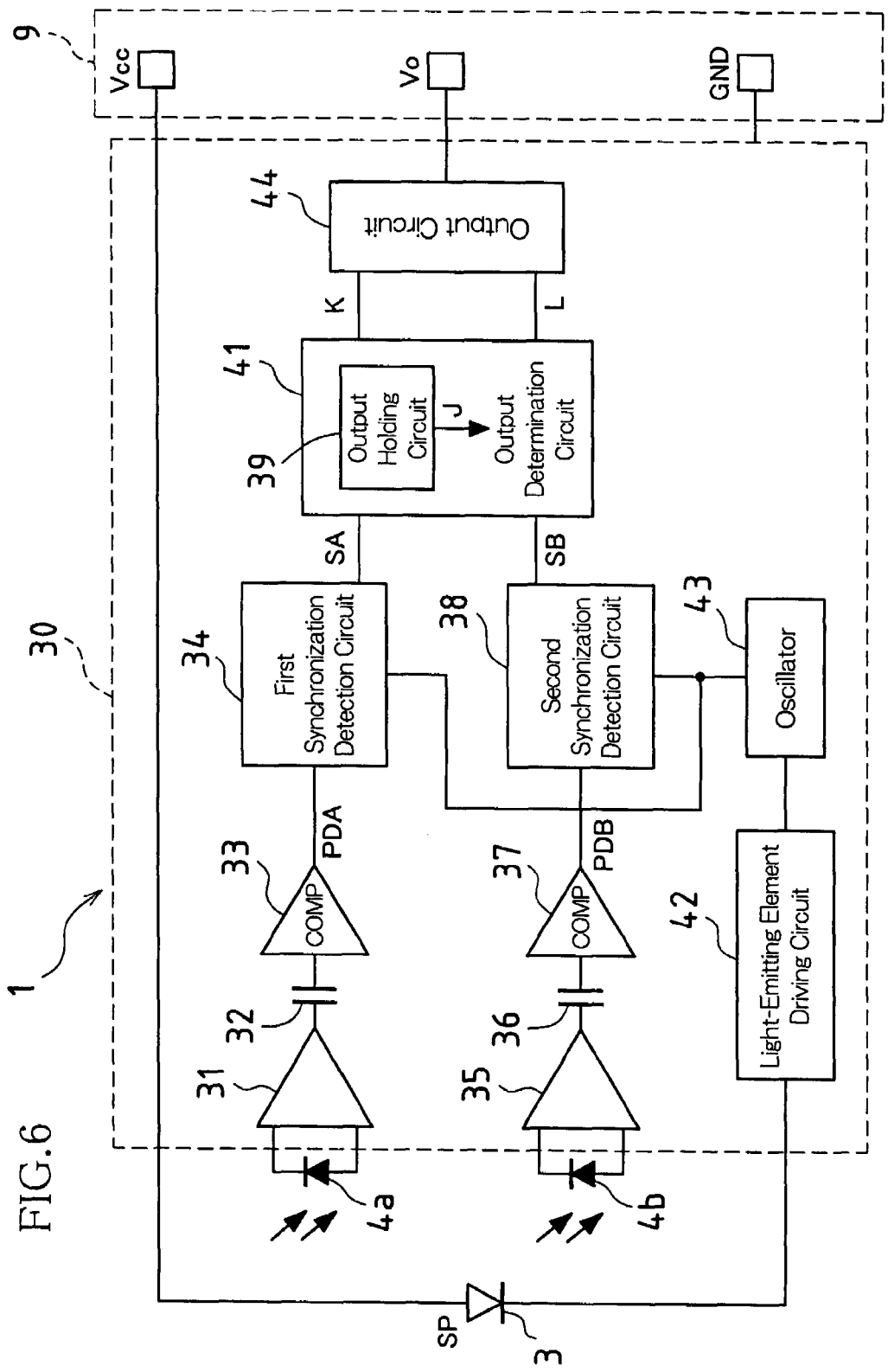
FIG. 6 is a block diagram illustrating a configuration of the moving object detection photointerrupter of FIG. 1.

FIG. 6 is a block diagram illustrating a configuration of the moving object detection photointerrupter 1 according to the present embodiment. The moving object detection photointerrupter 1 of the present embodiment comprises the light-emitting element 3, the first and second light-receiving elements 4a and 4b of the light-receiving chip 4, a computation control portion 30 that drives and controls the light-emitting element 3 and computes the detection output of the first and second light-receiving elements 4a and 4b, and a connector 9 connected to an external circuit. The computation control portion 30 is an IC chip. The light-emitting element 3, the light-receiving chip 4, and the like may be selectively included and integrated into this IC chip.

The computation control portion 30 includes: an amplification circuit 31 that amplifies a detection signal from the first light-receiving element 4a; a capacitor 32 for blocking the DC element; a first comparator 33; a first synchronizing detection circuit 34; an amplification circuit 35 that amplifies a detection signal from the second light-receiving element 4b; a capacitor 36 for blocking the DC element (mainly, a noise element); a second comparator 37; a second synchronizing detection circuit 38; an output holding circuit 39 that outputs a holding signal J corresponding to changes in the signals outputted from the first and second synchronizing detection circuits 34 and 38; an output determination circuit 41 that processes signals SA and SB outputted from the first and second synchronizing detection circuits 34 and 38 and the holding signal J from the output holding circuit 39; an output circuit 44 that outputs an output signal Vo based on signals K and L from the output determination circuit 41; a light-emitting element driving circuit 42 that drives and controls the light-emitting element 3; and an oscillator 43.

The computation control portion 30 is supplied with a source voltage Vcc through the connector 9, and operates thereby.

The light-emitting element 3 is applied with the source voltage Vcc on its anode side through the connector 9, while its cathode side is connected to the light-emitting element driving circuit 42. The light-emitting element driving circuit 42 is inputted with an oscillation signal from the oscillator 43, and switches the path between the cathode side of the light-emitting element 3 and the ground in synchronization with the oscillation signal, whereupon a pulse-form signal SP is applied to the light-emitting element 3, causing the light-emitting element 3 to emit light in synchronization with the oscillation signal, and thus light pulses are emitted from the light-emitting element 3.

As mentioned earlier, when the moving object 11 moves in front of the first and second light-receiving elements 4a and 4b, the light from the light-emitting element 3 is reflected by the moving object 11 and enters into the first and second light-receiving elements 4a and 4b. The detection outputs of the first and second light-receiving elements 4a and 4b changes as the light reflected by the moving object 11 is received, as shown in FIG. 5; the DC elements of these are blocked by the capacitors 32 and 36, and the resultant are inputted into the first and second comparators 33 and 37 respectively.

The first comparator 33 compares the detection output of the first light-receiving element 4a with a prescribed threshold value, and generates and outputs a binary signal PDA that is high-level when the detection output is greater than or equal to the threshold value and is low-level when the detection output is less than the threshold value. In the same manner, the second comparator 37 compares the detection output of the second light-receiving element 4b with a threshold value, and generates and outputs a binary signal PDB.

The first synchronizing detection circuit 34 is inputted with the oscillation signal from the oscillator 43 and samples the binary signal from the first comparator 33 in synchronization with the oscillation signal; when the binary signal is high-level at least two times in a row in synchronization with the oscillation signal, the first synchronizing detection circuit 34 switches and holds the output signal SA from low-level to high-level, and when the binary signal is low-level at least two times in a row in synchronization with the oscillation signal, the first synchronizing detection circuit 34 switches and holds the output signal SA from high-level to low-level. In the same manner, the second synchronizing detection circuit 38 samples the binary signal from the second comparator 37 in synchronization with the oscillation signal from the oscillator 43; when the binary signal is high-level at least two times in a row in synchronization with the oscillation signal, the second synchronizing detection circuit 38 switches and holds the output signal SB from low-level to high-level, and when the binary signal is low-level at least two times in a row in synchronization with the oscillation signal, the second synchronizing detection circuit 38 switches and holds the output signal SB from high-level to low-level.

Therefore, the detection output of the first light-receiving element 4a is binarized by the first comparator 33, and then sampled by the first synchronizing detection circuit 34 at the timing at which light is emitted by the light-emitting element 3. The output signal SA of the first synchronizing detection circuit 34 is set to and held at the high-level when the detection output of the first light-receiving element 4a is high-level at least two times in a row at the timing at which light is emitted from the light-emitting element 3. In the same manner, the detection output of the second light-receiving element 4b is also binarized by the second comparator 37, and then sampled by the second synchronizing detection circuit 38 at the timing at which light is emitted by the light-emitting element 3. The output signal SB of the second synchronizing detection circuit 38 is set to and held at the high-level when the detection output of the second light-receiving element 4b is high-level at least two times in a row at the timing at which light is emitted from the light-emitting element 3.

The output signal SA of the first synchronizing detection circuit 34 is returned to low-level when the detection output of the first light-receiving element 4a is low-level at least two times in a row at the timing at which light is emitted from the light-emitting element 3; in the same manner, the output signal SB of the second synchronizing detection circuit 38 is returned to low-level when the detection output of the second light-receiving element 4b is low-level at least two times in a row at the timing at which light is emitted from the light-emitting element 3.

The output holding circuit 39 sets the holding signal J to high-level or low-level in accordance with change in the output signals SA and SB of the first and second synchronizing detection circuits 34 and 38 respectively. To be more specific, it is possible to assume that the moving object 11 once previous to the present moving object passed in the forward direction based on change in the output signals SA and SB of the first and second synchronizing detection circuits 34 and 38; next, when the present moving object 11 has been assumed to have passed in the forward direction, the holding signal J is set to high-level, whereas in other cases, the holding signal J is set to low-level.

The output determination circuit 41 is inputted with the output signals SA and SB of the first and second synchronizing detection circuits 34 and 38 respectively, and is also inputted with the holding signal J of the output holding circuit 39. Based on the signals SA, SB, and J, the output determination circuit 41 determines whether or not a moving object 11 has passed, outputs an output signal K to the output circuit 44 as a low-level pulse when the moving object 11 begins to pass in the forward direction, and outputs an output signal L to the output circuit 44 as a low-level pulse when the moving object 11 has finished passing in the forward direction.

The output circuit 44 is inputted with the output signals K and L from the output determination circuit 41, and switches the level of an output signal Vo based on these signals.

Determining that the moving object 11 has passed in the forward direction as performed by the output determination circuit 41 is performed accurately even if an abnormal operation, such as rebounding of the moving object 11, occurs, regardless of the distance of the rebound. Therefore, the moving object 11 can be accurately counted by counting the number of times the output signal Vo from the output circuit 44 is high-level.

Next, an operation for detecting the moving object 11 performed by the moving object detection photointerrupter 1 shall be described with reference to FIGS. 7 to 13.

Figure 7:
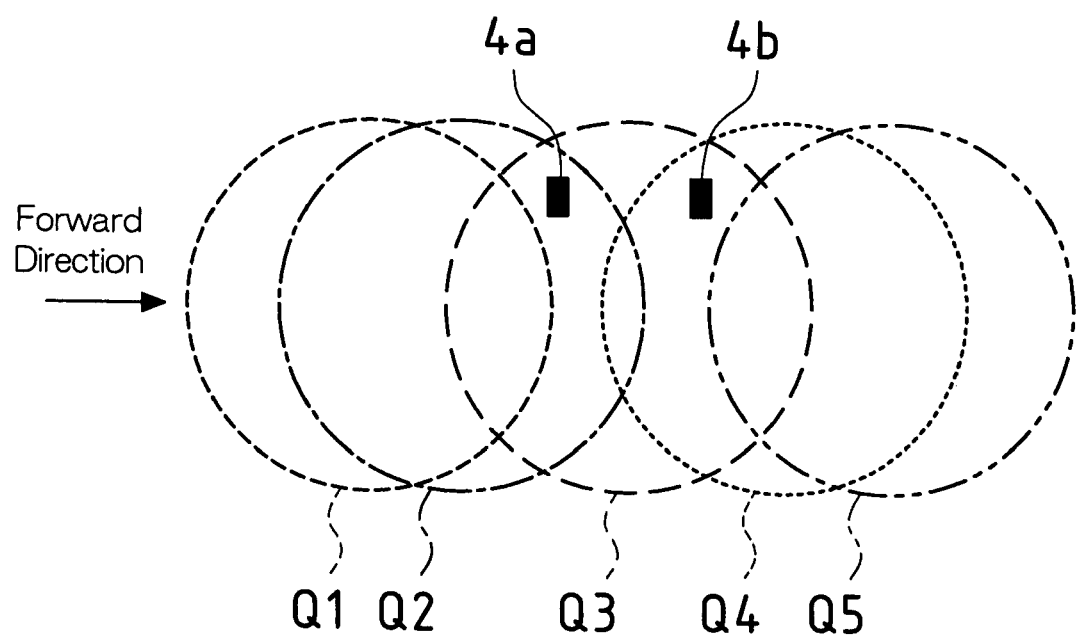
FIG. 7 is a diagram illustrating a course of movement of a moving object relative to first and second light-receiving elements of the moving object detection photointerrupter of FIG. 1.

FIG. 7 is a diagram illustrating a course of movement of a moving object 11 relative to the first and second light-receiving elements 4a and 4b of the moving object detection photointerrupter 1. Here, a passage position Q1 of immediately before the first and second light-receiving elements 4a and 4b, a passage position Q2 that crosses only in front of the first light-receiving element 4a, a passage position Q3 that crosses in front of both the first and second light-receiving elements 4a and 4b, a passage position Q4 that crosses only in front of the second light-receiving element 4b, and a passage position Q5 of immediately after the first and second light-receiving elements 4a and 4b illustrate the passage of the moving object 11 in the forward direction D.

Figure 8:
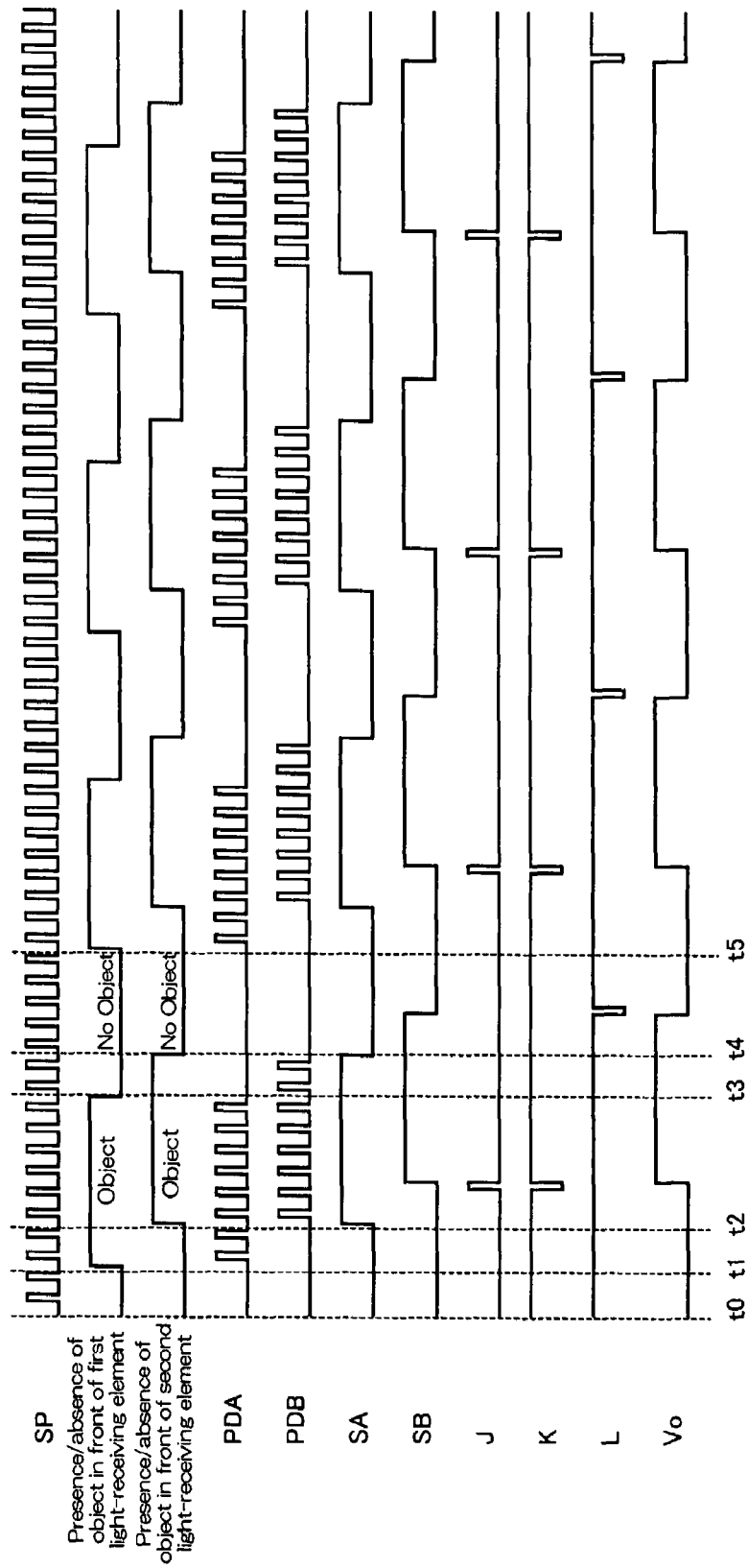
FIG. 8 is a timing chart illustrating operations of a moving object detection photointerrupter when a moving object passes in front of first and second light-receiving elements in the forward direction.

FIG. 8 is a timing chart illustrating operations of the moving object detection photointerrupter 1 when a moving object 11 passes in front of the first and second light-receiving elements 4a and 4b in the forward direction D. FIG. 8 shows the following: the pulse-form signal SP indicating the timing at which light is emitted by the light-emitting element 3; the presence/absence of the moving object 11 in front of the first and second light-receiving elements 4a and 4b; the binary signals PDA and PDB of the first and second comparators 33 and 37 respectively; the output signals SA and SB of the first and second synchronizing detection circuits 34 and 38 respectively; the holding signal J of the output holding circuit 39; the output signals K and L of the output determination circuit 41; and the output signal Vo of the output circuit 44.

In FIG. 8, the period from time t0 to time t1 is a period in which the moving object 11 is in the passage position Q1 shown in FIG. 7, or in other words, is immediately before the first and second light-receiving elements 4a and 4b. Because the moving object 11 is immediately before the first and second light-receiving elements 4a and 4b, the pulse light from the light-emitting element 3 is not reflected by the moving object 11 and does not enter into the first and second light-receiving elements 4a and 4b; the binary signals PDA and PDB of the first and second comparators 33 and 37 are low-level, and the output signals SA and SB of the first and second synchronizing detection circuits 34 and 38 are low-level as well. In addition, because this is the first moving object 11, the holding signal J of the output holding circuit 39 is set to low-level. At this time, the output determination circuit 41 holds the output signals K and L at high-level, in accordance with the output signals SA and SB of the first and second synchronizing detection circuits 34 and 38 respectively being low-level. Because the output signals K and L are high-level, the output circuit 44 holds the output signal Vo at low-level.

In FIG. 8, the period from time t1 to time t2 is a period in which the moving object 11 is in the passage position Q2, or in other words, is in front of the first light-receiving element 4a. Because the moving object 11 is in front of only the first light-receiving element 4a, the pulse light from the light-emitting element 3 is reflected by the moving object 11 and enters into only the first light-receiving element 4a. The reflected light does not enter into the second light-receiving element 4b. Immediately after the moving object 11 reaches in front of the first light-receiving element 4a, the binary signal PDA of the first comparator 33 is not high-level at least two times in a row at the timing of the light emitted by the light-emitting element 3, and therefore the output signal SA of the first synchronizing detection circuit 34 is held at low-level. Additionally, because the binary signal PDB of the second comparator 37 is held at low-level, the second synchronizing detection circuit 38 holds the output signal SB at low-level. The holding signal J of the output holding circuit 39 stays at high-level. At this time, because the output signals SA and SB of the first and second synchronizing detection circuits 34 and 38 respectively are low-level, the output determination circuit 41 holds the output signals K and L at high-level. Also, the output circuit 44 holds the output signal Vo at low-level.

In FIG. 8, the period from time t2 to time t3 is a period in which the moving object 11 is in the passage position Q3, or in other words, is in front of the first and second light-receiving elements 4a and 4b. When the moving object 11 reaches in front of the second light-receiving element 4b while it is also in front of the first light-receiving element 4a, the light pulse from the light-emitting element 3 is reflected by the moving object 11 and enters into the first and second light-receiving elements 4a and 4b. For this reason, the binary signals PDA and PDB of the first and second comparators 33 and 37 are both high-level, in synchronization with the light pulse from the light-emitting element 3. The first synchronizing detection circuit 34 samples the binary signal PDA of the first comparator 33 at the timing at which light is emitted from the light-emitting element 3, and switches the output signal SA to high-level when the binary signal PDA is high-level two times in a row. In the same manner, the second synchronizing detection circuit 38 samples the binary signal PDB of the second comparator 37 at the timing at which light is emitted from the light-emitting element 3, and switches the output signal SB to high-level when the binary signal PDB is high-level two times in a row. When the output signal SA switches from low-level to high-level, the output signal SB is low-level and the output signal SA is high-level, and thus the output holding circuit 39 switches the holding signal J to high-level until the output signal SB switches to high-level. At this time, the output determination circuit 41 holds the output signal K at low-level, the holding signal J having switched to high-level. In response to the output signal K becoming low-level, the output circuit 44 switches the output signal Vo to high-level. In other words, if the output signal SB is low-level (if the moving object 11 has started to move in the forward direction) when the output signal SA switches to high-level, the output signal K of the output determination circuit 41 is set to low-level, and the output signal Vo is switched to high-level.

In FIG. 8, the period from time t3 to time t4 is a period in which the moving object 11 is in the passage position Q4, or in other words, is in front of the second light-receiving element 4b. Because the moving object 11 moves past the first light-receiving element 4a and is in front of only the second light-receiving element 4b, the pulse light from the light-emitting element 3 is reflected by the moving object 11 and enters into only the second light-receiving element 4b. Immediately after the moving object 11 passes from in front of the first light-receiving element 4a, the binary signal PDA of the first comparator 33 is not low-level at least two times in a row at the timing of the light emitted by the light-emitting element 3, and therefore the output signal SA of the first synchronizing detection circuit 34 is held at high-level. Because the binary signal PDB is held at a cyclic high-level, the second synchronizing detection circuit 38 holds the output signal SB at high-level. The holding signal J of the output holding circuit 39 stays at low-level. At this time, the output determination circuit 41 holds the output signals K and L at high-level, in accordance with the output signals SA and SB of the first and second synchronizing detection circuits 34 and 38 respectively being high-level. Because the output signals K and L of the output determination circuit 41 are held at high-level, the output circuit 44 holds the output signal Vo at high-level.

In FIG. 8, the period from time t4 to time t5 is a period in which the moving object 11 is in the passage position Q5, or in other words, is immediately after the first and second light-receiving elements 4a and 4b. After the moving object 11 has passed in front of the first and second light-receiving elements 4a and 4b, the pulse light from the light-emitting element 3 is not reflected by the moving object 11 and does not enter into the first and second light-receiving elements 4a and 4b; the binary signals PDA and PDB of the first and second comparators 33 and 37 are low-level. The first synchronizing detection circuit 34 switches the output signal SA to low-level when the binary signal PDA is low-level two times in a row at the timing at which light is emitted from the light-emitting element 3. In the same manner, the second synchronizing detection circuit 38 switches the output signal SB to low-level when the binary signal PDB is low-level two times in a row at the timing at which light is emitted from the light-emitting element 3. When the output signal SA of the first synchronizing detection circuit 34 switches from high-level to low-level, the output signal SB of the second synchronizing detection circuit 38 is high-level; however, because the output signal SA is low-level, the output holding circuit 39 holds the holding signal J at low-level. In addition, when the output signal SB switches from high-level to low-level, the output signal SA is low-level, and thus the output determination circuit 41 puts the output signal L at low-level for one pulse (puts the outputs signal L at low-level for one pulse in response to the passage of the moving object 11 in the forward direction ending). In response to the output signal L of the output determination circuit 41 going to low-level, the output circuit 44 switches the output signal Vo to low-level.

Thereafter, in the same manner, the operations in the period from time t0 to time t5 are repeated as long as moving objects 11 pass in front of the first and second light-receiving elements 4a and 4b in the forward direction D; each time a moving object 11 passes through, the output signal Vo of the output circuit 44 goes to high-level. Therefore, the number of moving objects 11 can be counted by counting the number of times the output signal Vo goes to high-level.

It should be noted that although the first and second synchronizing detection circuits 34 and 38 switch the levels of their output signals when the detection outputs of the light-receiving elements go to high-level or low-level at least two times in a row at the timing at which light is emitted from the light-emitting element 3, the levels of the output signals may also be switched when the detection outputs go to high-level or low-level at least three times in a row. In addition, switching the levels of the outputs signals of the first and second synchronizing detection circuits 34 and 38 may be performed at the starting point of the timing at which light is emitted from the light-emitting element, or may be performed at the ending point of the timing at which light is emitted from the light-emitting element. Furthermore, while the presence/absence of the moving object 11 indicating whether or not a moving object 11 is passing in front of the second light-receiving element 4b and the output signal SA of the first synchronizing detection circuit 34 change in synchronization, there is no correlation herein.

Figure 9:
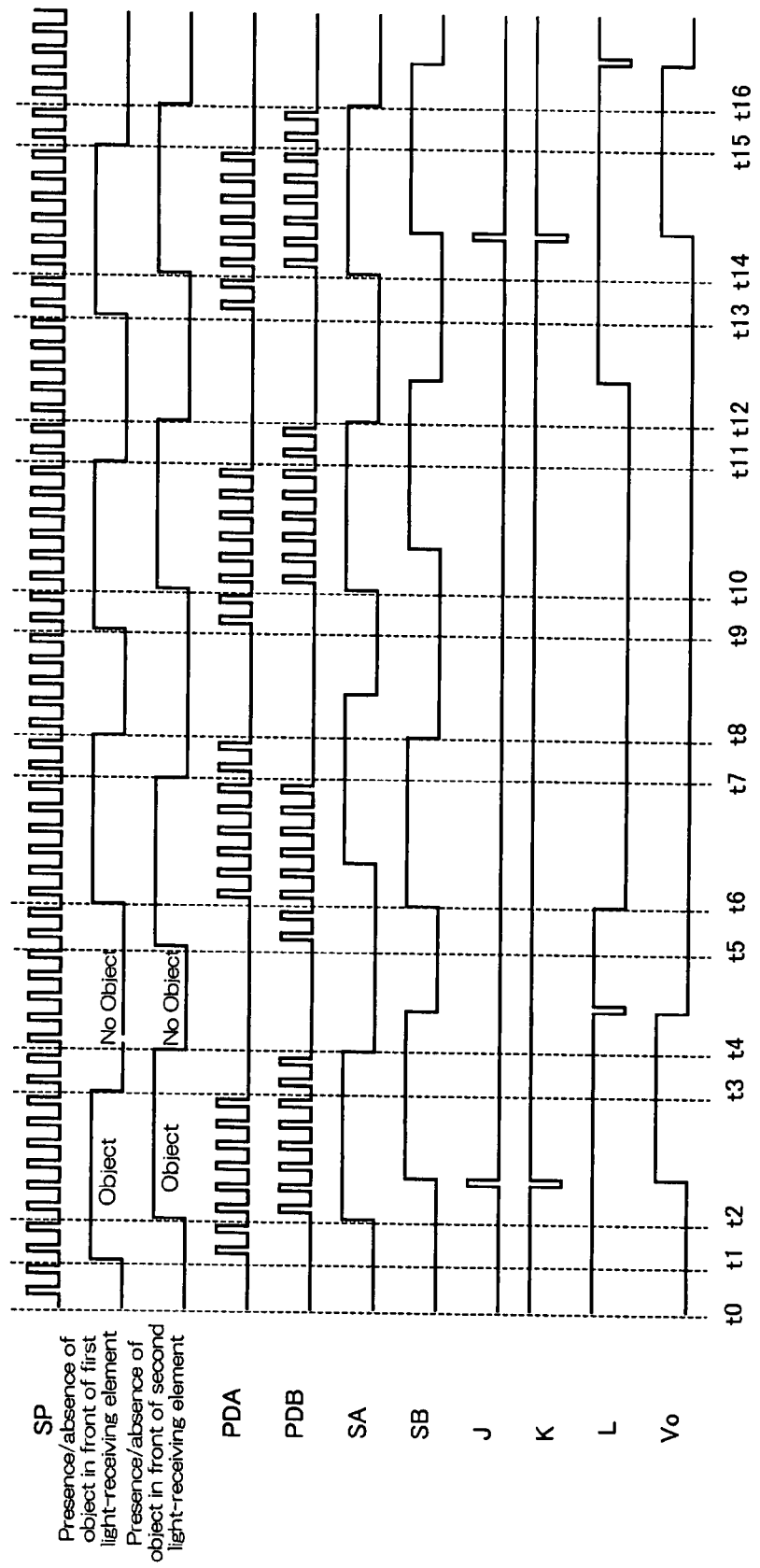
FIG. 9 is a timing chart illustrating operations of a moving object detection photointerrupter when a moving object passes in front of first and second light-receiving elements in the forward direction, then rebounds and returns, and passes in front of the first and second light-receiving elements in the reverse direction.

Next, referring to the timing chart of FIG. 9, descriptions shall be given regarding operations when a moving object 11 rebounds and passes in front of the first and second light-receiving elements 4a and 4b in the reverse direction after having passed in front of the first and second light-receiving elements 4a and 4b in the forward direction D.

Note that in the same manner as FIG. 8, FIG. 9 shows the pulse-form signal SP; the presence/absence of the moving object 11 in front of the first and second light-receiving elements 4a and 4b; the binary signals PDA and PDB of the first and second comparators 33 and 37 respectively; the output signals SA and SB of the first and second synchronizing detection circuits 34 and 38 respectively; the holding signal J of the output holding circuit 39; the output signals K and L of the output determination circuit 41; and the output signal Vo of the output circuit 44.

Additionally, when the moving object 11 passes in front of the first and second light-receiving elements 4a and 4b in the forward direction D, the same operations indicated in time t0 to time t5 in FIG. 8 are carried out; accordingly, descriptions of these operations shall be omitted, and descriptions shall instead be given from time t5, when the moving object 11 has rebounded and returned.

In FIG. 9, the period from time t5 to time t6 is a period in which the moving object 11 is in the passage position Q4, or in other words, is in front of the second light-receiving element 4b, having rebounded and returned. Because the moving object 11 is in front of only the second light-receiving element 4b, the pulse light from the light-emitting element 3 is reflected by the moving object 11 and enters into only the second light-receiving element 4b. The reflected light does not enter into the first light-receiving element 4a. Immediately after the moving object 11 reaches in front of the second light-receiving element 4b, the binary signal PDB of the second comparator 37 is not high-level at least two times in a row at the timing of the light emitted by the light-emitting element 3, and therefore the output signal SB of the second synchronizing detection circuit 38 is held at low-level. Additionally, because the binary signal PDA of the first comparator 33 is held at low-level, the first synchronizing detection circuit 34 holds the output signal SA at low-level. Because the output signal SA of the first synchronizing detection circuit 34 has not been switched, the output holding circuit 39 holds the holding signal J at low-level. At this time, because the output signals SA and SB of the first and second synchronizing detection circuits 34 and 38 respectively are low-level, the output determination circuit 41 holds the output signals K and L at high-level. Also, because the output signals K and L are high-level, the output circuit 44 holds the output signal Vo at low-level.

In FIG. 9, the period from time t6 to time t7 is a period in which the moving object 11 is in the passage position Q3, or in other words, is in front of the first and second light-receiving elements 4a and 4b. When the moving object 11 reaches in front of the first light-receiving element 4a while it is also in front of the second light-receiving element 4b, the light pulse from the light-emitting element 3 is reflected by the moving object 11 and enters into the first and second light-receiving elements 4a and 4b. For this reason, the binary signals PDA and PDB of the first and second comparators 33 and 37 are both high-level, in synchronization with the light pulse from the light-emitting element 3. The second synchronizing detection circuit 38 switches the output signal SB to high-level when the binary signal PDB of the second comparator 37 is high-level two times in a row at the timing at which light is emitted from the light-emitting element 3. Next, the first synchronizing detection circuit 34 switches the output signal SA to high-level when the binary signal PDA of the first comparator 33 is high-level two times in a row at the timing at which light is emitted from the light-emitting element 3. When the output signal SA of the first synchronizing detection circuit 34 switches from low-level to high-level, the output signal SB of the second synchronizing detection circuit 38 is high-level (the moving object 11 has passed in the reverse direction), and therefore the output holding circuit 39 holds the holding signal J at low-level. Because the holding signal J of the output holding circuit 39 is held at low-level, the output determination circuit 41 holds the output signal K at high-level. In addition, when the output signal SB of the second synchronizing detection circuit 38 switches from low-level to high-level, the output signal SA of the first synchronizing detection circuit 34 is low-level; thus the output determination circuit 41 determines that the moving object 11 has begun passing in the reverse direction, and switches the output signal L to low-level. Because the output signal K from the output determination circuit 41 is held at high-level, the output circuit 44 holds the output signal Vo at low-level.

In other words, when the moving object 11 has begun passing in the reverse direction, the holding signal J of the output holding circuit 39 is not switched to high-level and rather remains at low-level. Based on this, the output signal K of the output determination circuit 41 is also held at high-level, and the output signal Vo is held at low-level.

In FIG. 9, the period from time t7 to time t8 is a period in which the moving object 11 is in the passage position Q2, or in other words, is in front of the first light-receiving element 4a. Because the moving object 11 is in front of only the first light-receiving element 4a having passed by the front of the second light-receiving element 4b, the pulse light from the light-emitting element 3 is reflected by the moving object 11 and enters into only the first light-receiving element 4a. Immediately after the moving object 11 passes in front of the second light-receiving element 4b, the binary signal PDB of the second comparator 37 is not low-level at least two times in a row at the timing of the light emitted by the light-emitting element 3, and therefore the output signal SB of the second synchronizing detection circuit 38 is held at high-level. Because the binary signal PDA is held at a cyclic high-level, the first synchronizing detection circuit 34 holds the output signal SA at high-level.

In FIG. 9, the period from time t8 to time t9 is a period in which the moving object 11 is in the passage position Q1, or in other words, is immediately before the first and second light-receiving elements 4a and 4b. When the moving object 11 passes in front of the first and second light-receiving elements 4a and 4b in the reverse direction, the light pulse from the light-emitting element 3 is not reflected by the moving object 11 and does not enter into the first and second light-receiving elements 4a and 4b; thus, the binary signals PDA and PDB of the first and second comparators 33 and 37 are low-level. The first synchronizing detection circuit 34 switches the output signal SA to low-level when the binary signal PDA is low-level two times in a row at the timing at which light is emitted from the light-emitting element 3. In addition, the second synchronizing detection circuit 38 switches the output signal SB to low-level when the binary signal PDB is low-level two times in a row at the timing at which light is emitted from the light-emitting element 3. The holding signal J of the output holding circuit 39 stays at low-level. The output determination circuit 41 holds the output signal K at high-level, based on the holding signal J being low-level. In addition, when the output signal SB of the second synchronizing detection circuit 38 switches from high-level to low-level, the output signal SA of the first synchronizing detection circuit 34 is high-level; therefore, the output determination circuit 41 determines that the passage of the moving object 11 in the reverse direction has ended, and holds the output signal L at low-level. The output circuit 44 holds the output signal Vo at low-level based on the output signals K and L of the output determination circuit 41.

In FIG. 9, the period from time t9 to time t10 is a period in which the moving object 11 is in the passage position Q2, or in other words, has passed in front of the first and second light-receiving elements 4a and 4b in the reverse direction but has once again moved in the forward direction D and is in front of the first light-receiving element 4a. Because the moving object 11 is in front of only the first light-receiving element 4a, the pulse light from the light-emitting element 3 enters into only the first light-receiving element 4a. The pulse light does not enter into the second light-receiving element 4b. Because this is immediately after the moving object 11 has reached in front of the first light-receiving element 4a, the binary signal PDA of the first comparator 33 is not high-level at least two times in a row, and therefore the output signal SA of the first synchronizing detection circuit 34 is held at low-level. Additionally, because the binary signal PDB of the second comparator 37 is held at low-level, the second synchronizing detection circuit 38 holds the output signal SB at low-level. The holding signal J of the output holding circuit 39 stays at low-level. At this time, the output determination circuit 41 holds the output signal K at high-level and the output signal L at low-level. Based on this, the output circuit 44 holds the output signal Vo at low-level.

In FIG. 9, the period from time t10 to time t11 is a period in which the moving object 11 is in the passage position Q3, or in other words, is in front of the first and second light-receiving elements 4a and 4b. When the moving object 11 reaches in front of the second light-receiving element 4b while it is also in front of the first light-receiving element 4a, the light pulse from the light-emitting element 3 enters into the first and second light-receiving elements 4a and 4b. For this reason, the binary signals PDA and PDB of the first and second comparators 33 and 37 are both high-level, in synchronization with the light pulse from the light-emitting element 3. The first synchronizing detection circuit 34 switches the output signal SA to high-level when the binary signal PDA of the first comparator 33 is high-level two times in a row. In the same manner, the second synchronizing detection circuit 38 switches the output signal SB to high-level when the binary signal PDB of the second comparator 37 is high-level two times in a row. When the output signal SA of the first synchronizing detection circuit 34 switches from low-level to high-level, the output signal SB of the second synchronizing detection circuit 38 is low-level, and the output signal SA is high-level; however, because the output signal SB of the second synchronizing detection circuit 38 was low-level (the moving object 11 one previous to the present moving object 11 finished passing in the reverse direction) when the output signal SA of the first synchronizing detection circuit 34 switched from high-level to low-level in the period from time t8 to time t9, the output holding circuit 39 holds the holding signal J at low-level. Based on the holding signal J being low-level, the output determination circuit 41 holds the output signal K at high-level, and holds the output signal L at low-level.

In FIG. 9, the period from time t11 to time t12 is a period in which the moving object 11 is in the passage position Q4, or in other words, is in front of the second light-receiving element 4b. Because the moving object 11 moves past the first light-receiving element 4a and is in front of only the second light-receiving element 4b, the pulse light from the light-emitting element 3 enters into only the second light-receiving element 4b. Immediately after the moving object 11 passes from in front of the first light-receiving element 4a, the binary signal PDA of the first comparator 33 is not low-level at least two times in a row, and therefore the output signal SA of the first synchronizing detection circuit 34 is held at high-level. Because the binary signal PDB is held at a cyclic high-level, the second synchronizing detection circuit 38 holds the output signal SB at high-level. The output holding circuit 39 holds the holding signal J at low-level. In addition, because the holding signal J is low-level, the output determination circuit 41 holds the output signal K at high-level, and keeps the output signal L at low-level. Along with this, the output circuit 44 holds the output signal Vo at low-level.

In FIG. 9, the period from time t12 to time t13 is a period in which the moving object 11 is in the passage position Q5, or in other words, is immediately after the first and second light-receiving elements 4a and 4b. When the moving object 11 passes in front of the first and second light-receiving elements 4a and 4b, the light pulse from the light-emitting element 3 does not enter into the first and second light-receiving elements 4a and 4b; thus, the binary signals PDA and PDB of the first and second comparators 33 and 37 are low-level. The first synchronizing detection circuit 34 switches the output signal SA to low-level when the binary signal PDA is low-level two times in a row. In the same manner, the second synchronizing detection circuit 38 switches the output signal SB to low-level when the binary signal PDB is low-level two times in a row. The output holding circuit 39 holds the holding signal J at low-level. At this time, the output determination circuit 41 holds the output signal K at high-level based on the holding signal J being low-level. In addition, when the output signal SB of the second synchronizing detection circuit 38 switches from high-level to low-level, the output signal SA of the first synchronizing detection circuit 34 is low-level (the moving object 11 has finished passing in the forward direction); thus the output determination circuit 41 switches the output signal L from low-level to high-level. Because the output signal K is held at low-level, the output circuit 44 holds the output signal Vo at low-level.

In this manner, in the period from time t6 to time t12 shown in FIG. 9, the moving object 11 rebounds and returns, passing in front of the first and second light-receiving elements 4a and 4b in the reverse direction, and furthermore, the moving object 11 once again passes in front of the first and second light-receiving elements 4a and 4b in the forward direction D; however, because the output signal K of the output determination circuit 41 is held at high-level, the output signal Vo of the output circuit 44 is not switched to high-level, and therefore the moving object 11 is not determined to have passed. In the period from time t0 to time t5, which is prior to the rebound and return, the moving object 11 has already passed in front of the first and second light-receiving elements 4a and 4b in the forward direction D, and this passage has already been determined to have occurred; therefore, a second passage is not determined to have occurred even if the moving object 11 once again passes in the forward direction D after having rebounded and returned in the reverse direction. Through this, the output signal Vo only becomes high-level once in response to the passage of the same moving object 11, and thus errors do not arise in the counting of the moving object 11.

In FIG. 9, from time t13 on, the operations of the period from time t0 to time t5 as shown in FIG. 8 are repeated as long as the moving object 11 passes in front of the first and second light-receiving elements 4a and 4b in the forward direction D, and each time the moving object 11 passes, the output signal Vo of the output circuit 44 becomes high-level.

Figure 10:
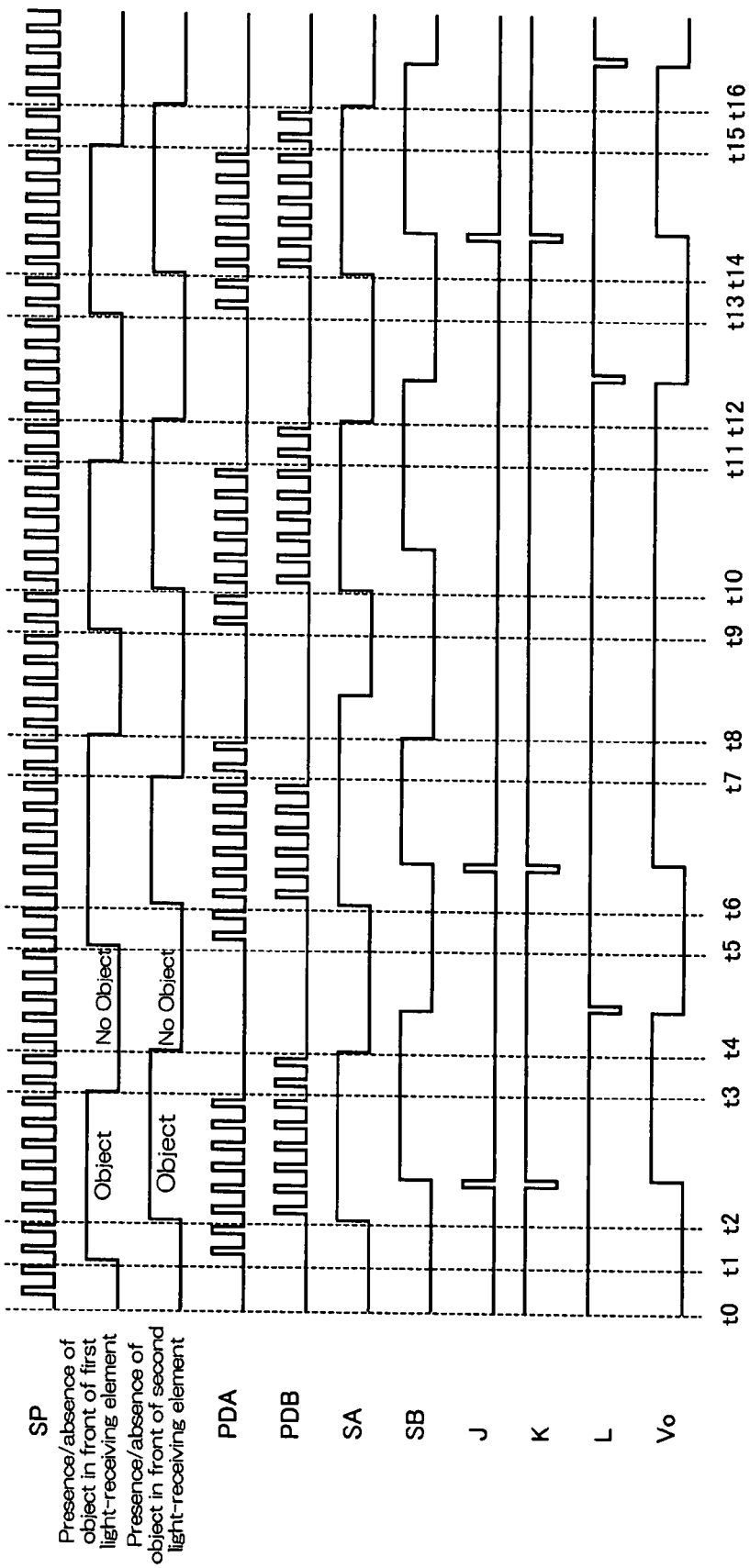
FIG. 10 is a timing chart illustrating operations of a moving object detection photointerrupter when a moving object moves to in front of first and second light-receiving elements in the forward direction, rebounds and returns, and then continues on and once again passes through in the forward direction.

Next, referring to the timing chart of FIG. 10, descriptions shall be given regarding operations when a moving object 11 passes in front of the first and second light-receiving elements 4a and 4b in the forward direction D, rebounds at the passage position Q3, and then once again passes through in the forward direction D.

Note that in the same manner as FIG. 8, FIG. 10 shows the pulse-form signal SP; the presence/absence of the moving object 11 in front of the first and second light-receiving elements 4a and 4b; the binary signals PDA and PDB; the output signals SA and SB; the output signals K and L of the output determination circuit 41; and the output signal Vo of the output circuit 44.

Additionally, when the moving object 11 passes in front of the first and second light-receiving elements 4a and 4b in the forward direction D, the same operations indicated in time t0 to time t5 in FIG. 8 are carried out; accordingly, descriptions of these operations shall be omitted, and descriptions shall instead be given of the operations from time t5, immediately prior to the next moving object 11 rebounding and returning at the passage position Q3.

In FIG. 10, the period from time t5 to time t6 is a period in which the moving object 11 is in the passage position Q2, or in other words, is in front of the first light-receiving element 4a. Because the moving object 11 crosses in front of only the first light-receiving element 4a, the pulse light from the light-emitting element 3 enters into only the first light-receiving element 4a. The pulse light does not enter into the second light-receiving element 4b. Immediately after the moving object 11 reaches in front of the first light-receiving element 4a, the binary signal PDA of the first comparator 33 is not high-level at least two times in a row, and therefore the output signal SA of the first synchronizing detection circuit 34 is held at low-level. Additionally, because the binary signal PDB of the second comparator 37 is held at low-level, the second synchronizing detection circuit 38 holds the output signal SB at low-level. The output holding circuit 39 sets the holding signal J to low-level. At this time, the output determination circuit 41 holds the output signals K and L at high-level, in accordance with the output signals SA and SB of the first and second synchronizing detection circuits 34 and 38 respectively being low-level. Because the output signals K and L are high-level, the output circuit 44 holds the output signal Vo at low-level.

In FIG. 10, the period from time t6 to time t7 is a period in which the moving object 11 is in the passage position Q3, or in other words, is in front of the first and second light-receiving elements 4a and 4b. Because the moving object 11 has moved further and is in front of the first and second light-receiving elements 4a and 4b, the pulse light from the light-emitting element 3 enters into the first and second light-receiving elements 4a and 4b. For this reason, the binary signals PDA and PDB of the first and second comparators 33 and 37 both become high-level. When the binary signals PDA and PDB of the first and second comparators 33 and 37 are high-level two times in a row, the first and second synchronizing detection circuits 34 and 38 switch their respective output signals SA and SB to high-level. When the output signal SA switches from low-level to high-level, the output signal SB is low-level and the output signal SA is high-level, and thus the output holding circuit 39 switches the holding signal J to high-level until the output signal SB switches to high-level. At this time, the output determination circuit 41 sets the output signal K to low-level in response to the holding signal J of the output holding circuit 39 becoming high-level. In response to the output signal K being low-level, the output circuit 44 switches the output signal Vo to high-level. In other words, if the output signal SB is low-level (if the moving object 11 has started to move in the forward direction) when the output signal SA switches to high-level, the output signal K of the output determination circuit 41 is set to low-level, and the output signal Vo is switched to high-level.

In FIG. 10, the period from time t7 to time t8 is a period in which the moving object 11 rebounds in passage position Q3 and returns to passage position Q2. Because the moving object 11 returns from in front of the second light-receiving element 4b and is in front of only the first light-receiving element 4a, the pulse light from the light-emitting element 3 enters into only the first light-receiving element 4a. Immediately after the moving object 11 returns from in front of the second light-receiving element 4b, the binary signal PDB of the second comparator 37 is not low-level at least two times in a row, and therefore the output signal SB of the second synchronizing detection circuit 38 is held at high-level. Because the binary signal PDA is held at a cyclic high-level, the first synchronizing detection circuit 34 holds the output signal SA at high-level. The holding signal J of the output holding circuit 39 stays at low-level. At this time, the output determination circuit 41 holds the output signals K and L at high-level, in accordance with the output signals SA and SB of the first and second synchronizing detection circuits 34 and 38 respectively being high-level. Because the output signals K and L of the output determination circuit 41 are held at high-level, the output circuit 44 holds the output signal Vo at high-level.

In FIG. 10, the period from time t8 to time t9 is a period in which the moving object 11 is in the passage position Q1, or in other words, has returned to immediately before the first and second light-receiving elements 4a and 4b. When the moving object 11 returns from in front of the first and second light-receiving elements 4a and 4b in the reverse direction, the light pulse from the light-emitting element 3 does not enter into the first and second light-receiving elements 4a and 4b; thus, the binary signals PDA and PDB of the first and second comparators 33 and 37 are low-level. When the binary signals PDA and PDB of the first and second comparators 33 and 37 are low-level two times in a row, the first and second synchronizing detection circuits 34 and 38 switch their respective output signals SA and SB to low-level. The holding signal J of the output holding circuit 39 stays at low-level. The output determination circuit 41 holds the output signal K at high-level, based on the holding signal J being low-level. In addition, when the output signal SB of the second synchronizing detection circuit 38 switches from high-level to low-level, the output signal SA of the first synchronizing detection circuit 34 is high-level; therefore, the output determination circuit 41 determines that the passage of the moving object 11 in the reverse direction has ended, and holds the output signal L at high-level. Because the output signals K and L of the output determination circuit 41 are both held at high-level, the output circuit 44 holds the output signal Vo at high-level.

In FIG. 10, the period from time t9 to time t10 is a period in which the moving object 11 is in the passage position Q2, or in other words, has returned from in front of the first and second light-receiving elements 4a and 4b in the reverse direction but has once again moved in the forward direction D and is in front of the first light-receiving element 4a. Because the moving object 11 is in front of only the first light-receiving element 4a, the pulse light from the light-emitting element 3 enters into only the first light-receiving element 4a. The pulse light does not enter into the second light-receiving element 4b. Also, because this is immediately after the moving object 11 has reached in front of the first light-receiving element 4a, the binary signal PDA of the first comparator 33 is not high-level at least two times in a row, and therefore the output signal SA of the first synchronizing detection circuit 34 is held at low-level. Additionally, because the binary signal PDB of the second comparator 37 is held at low-level, the second synchronizing detection circuit 38 holds the output signal SB at low-level. The holding signal J of the output holding circuit 39 stays at low-level. At this time, the output determination circuit 41 holds the output signals K and L at high-level, in accordance with the output signals SA and SB of the first and second synchronizing detection circuits 34 and 38 respectively being low-level. Because the output signals K and L are high-level, the output circuit 44 does not switch the output signal Vo, and holds the output signal Vo at high-level.

In FIG. 10, the period from time t10 to time t11 is a period in which the moving object 11 is in the passage position Q3, or in other words, has moved along further and is in front of the first and second light-receiving elements 4a and 4b. In this state, the pulse light from the light-emitting element 3 enters into the first and second light-receiving elements 4a and 4b. For this reason, the binary signals PDA and PDB of the first and second comparators 33 and 37 both become high-level. When the binary signals PDA and PDB of the first and second comparators 33 and 37 are high-level two times in a row, the first and second synchronizing detection circuits 34 and 38 switch their respective output signals SA and SB to high-level. When the output signal SA of the first synchronizing detection circuit 34 switches from low-level to high-level, the output signal SB of the second synchronizing detection circuit 38 is low-level, and the output signal SA is high-level; however, because the output signal SB of the second synchronizing detection circuit 38 was low-level (the moving object 11 one previous to the present moving object 11 finished passing in the reverse direction) when the output signal SA of the first synchronizing detection circuit 34 switched from high-level to low-level in the period from time t8 to time t9, the output holding circuit 39 holds the holding signal J at low-level. At this time, because the holding signal J of the output holding circuit 39 is low-level, the output determination circuit 41 holds the output signal K at high-level. Because the output signals K and L are held at high-level, the output circuit 44 holds the output signal Vo at high-level. In other words, the moving object 11 begins passing in the forward direction, but because the previous moving object 11 has finished passing in the reverse direction, the output signal Vo is held at high-level.

In FIG. 10, the period from time t11 to time t12 is a period in which the moving object 11 is in the passage position Q4, or in other words, is in front of the second light-receiving element 4b. In this state, the pulse light from the light-emitting element 3 enters into only the second light-receiving element 4b. Immediately after the moving object 11 passes from in front of the first light-receiving element 4a, the binary signal PDA of the first comparator 33 is not low-level at least two times in a row, and therefore the output signal SA of the first synchronizing detection circuit 34 is held at high-level. Because the binary signal PDB is held at a cyclic high-level, the second synchronizing detection circuit 38 holds the output signal SB at high-level. The holding signal J of the output holding circuit 39 stays at low-level. At this time, the output determination circuit 41 holds the output signals K and L at high-level, in accordance with the output signals SA and SB of the first and second synchronizing detection circuits 34 and 38 respectively being high-level. Because the output signals K and L of the output determination circuit 41 are held at high-level, the output circuit 44 holds the output signal Vo at high-level.

In FIG. 10, the period from time t12 to time t13 is a period in which the moving object 11 is in the passage position Q5, or in other words, is immediately after the first and second light-receiving elements 4a and 4b. In this state, the pulse light from the light-emitting element 3 does not enter into the first and second light-receiving elements 4a and 4b, and thus the binary signals PDA and PDB of the first and second comparators 33 and 37 are low-level. When the binary signals PDA and PDB of the first and second comparators 33 and 37 are low-level two times in a row, the first and second synchronizing detection circuits 34 and 38 switch their respective output signals SA and SB to low-level. When the output signal SA of the first synchronizing detection circuit 34 switches from high-level to low-level, the output signal SB of the second synchronizing detection circuit 38 is high-level; therefore, the output holding circuit 39 keeps the holding signal J at low-level. At this time, because the holding signal J is low-level, the output determination circuit 41 holds the output signal K at high-level. In addition, when the output signal SB of the second synchronizing detection circuit 38 switches from high-level to low-level, the output signal SA of the first synchronizing detection circuit 34 is low-level; thus the output determination circuit 41 puts the output signal L at low-level for one pulse. In response to the output signal L becoming low-level, the output circuit 44 switches the output signal Vo from high-level to low-level.

In this manner, in the period from time t8 to time t12 shown in FIG. 10, the moving object 11 rebounds and returns at passage position Q3, and once again moves to in front of the first and second light-receiving elements 4a and 4b; however, the output signal Vo is held at high-level and is not switched to low-level. Then, in the period from time t12 to time t13, when the moving object 11 passes in front of the first and second light-receiving elements 4a and 4b in the forward direction D, the output signals SA and SB of the first and second synchronizing detection circuits 34 and 38 are switched to low-level, in response to which the output signal Vo is switched to low-level. Through this, even if the moving object 11 rebounds during passage, the output signal Vo goes to high-level only once up until the moving object 11 has completely passed through, and thus errors do not arise in the counting of the moving object 11.

In FIG. 10, from time t13 on, the operations of the period from time to time t5 as shown in FIG. 8 are repeated as long as the moving object 11 passes in front of the first and second light-receiving elements 4a and 4b in the forward direction D, and each time the moving object 11 passes, the output signal Vo of the output circuit 44 becomes high-level.

Figure 11:
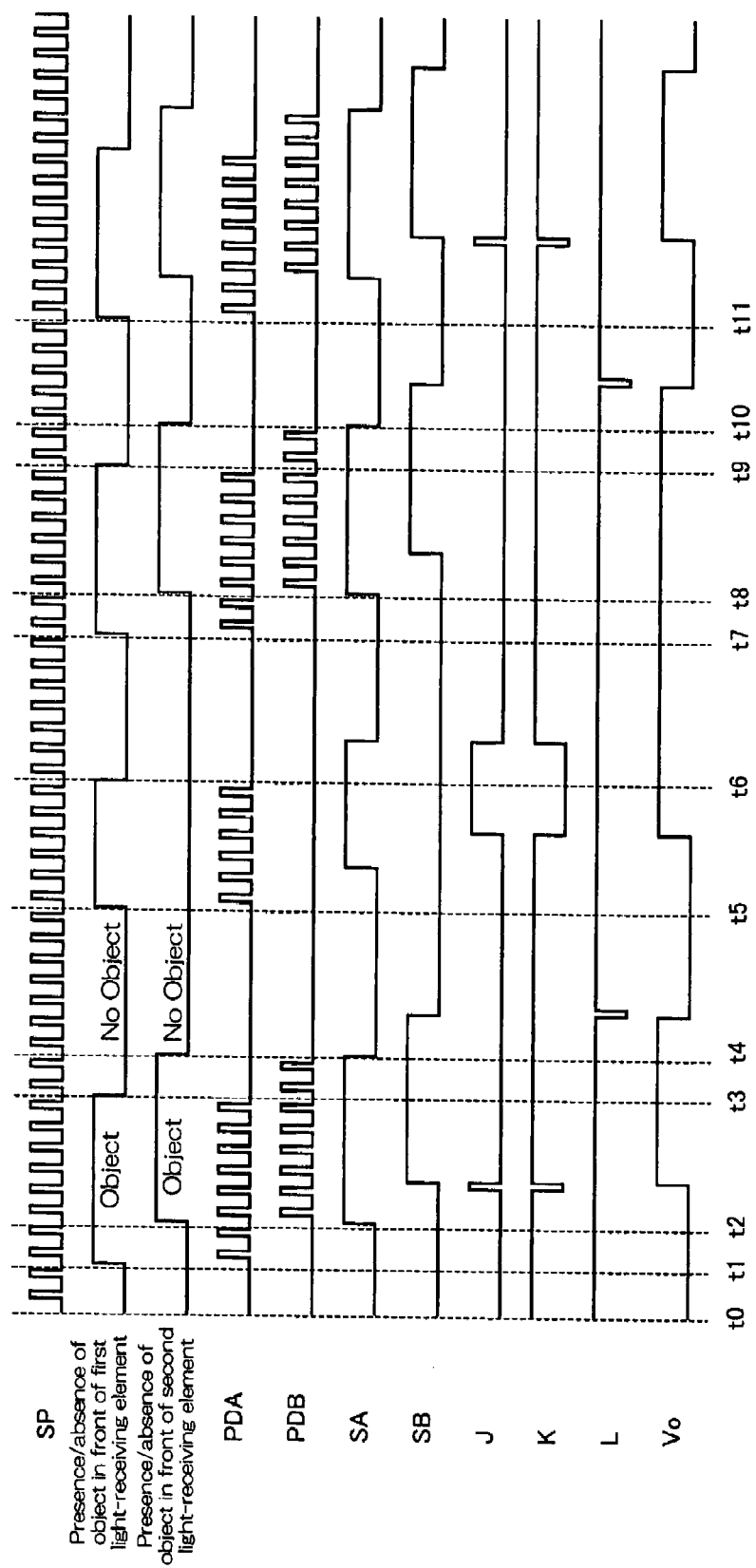
FIG. 11 is a timing chart illustrating operations of a moving object detection photointerrupter when a moving object moves to in front of a first light-receiving element in the forward direction, rebounds and returns, and then continues on and once again passes through in the forward direction.

Next, referring to the timing chart of FIG. 11, descriptions shall be given regarding operations when a moving object 11 passes to in front of the first light-receiving element 4a in the forward direction D, rebounds at the passage position Q2, and then once again passes through in the forward direction D.

Note that in the same manner as FIG. 8, FIG. 11 shows the pulse-form signal SP; the presence/absence of the moving object 11 in front of the first and second light-receiving elements 4a and 4b; the binary signals PDA and PDB; the output signals SA and SB; the signals K and L; and the output signal Vo.

Additionally, when the moving object 11 passes in front of the first and second light-receiving elements 4a and 4b in the forward direction D, the same operations indicated in time t0 to time t5 in FIG. 8 are carried out; accordingly, descriptions of these operations shall be omitted, and descriptions shall instead be given of the operations from time t5, immediately prior to the next moving object 11 rebounding and returning at the passage position Q2.

In FIG. 11, the period from time t5 to time t6 is a period in which the moving object 11 is in the passage position Q2, or in other words, is in front of the first light-receiving element 4a. Because the moving object 11 is in front of only the first light-receiving element 4a, and has rebounded and returned before reaching the second light-receiving element 4b, the pulse light from the light-emitting element 3 enters into only the first light-receiving element 4a. The pulse light does not enter into the second light-receiving element 4b. For this reason, the binary signal PDA of the first comparator 33 becomes high-level, but the binary signal PDB of the second comparator 37 stays at low-level. The first synchronizing detection circuit 34 switches the output signal SA to high-level when the binary signal PDA of the first comparator 33 is high-level two times in a row. In addition, the second synchronizing detection circuit 38 holds the output signal SB at low-level. When the output signal SA of the first synchronizing detection circuit 34 switches from low-level to high-level, the output signal SB of the second synchronizing detection circuit 38 is low-level, and therefore the output holding circuit 39 outputs one pulse of a high-level holding signal J. At this time, the output determination circuit 41 puts the output signal K at low-level for one pulse in response to the holding signal J having been put at high-level for one pulse. In addition, because the output signal SB of the second synchronizing detection circuit 38 stays at low-level, the output determination circuit 41 holds the output signal L at high-level. In response to the output signal K becoming low-level, the output circuit 44 switches the output signal Vo from low-level to high-level.

In FIG. 11, the period from time t6 to time t7 is a period in which the moving object 11 is in the passage position Q1, or in other words, is immediately before the first and second light-receiving elements 4a and 4b. When the moving object 11 returns from in front of the first and second light-receiving elements 4a and 4b in the reverse direction, the light pulse from the light-emitting element 3 does not enter into the first and second light-receiving elements 4a and 4b; thus, the binary signals PDA and PDB of the first and second comparators 33 and 37 are low-level. The first synchronizing detection circuit 34 switches the output signal SA to low-level when the binary signal PDA of the first comparator 33 is low-level two times in a row. In addition, the second synchronizing detection circuit 38 holds the output signal SB at low-level. The holding signal J of the output holding circuit 39 stays at low-level. At this time, because the holding signal J is low-level, the output determination circuit 41 holds the output signal K at high-level. In addition, because the output signal SB of the second synchronizing detection circuit 38 stays at low-level, the output determination circuit 41 holds the output signal L at high-level. Because the output signals K and L from the output determination circuit 41 are both held at high-level, the output circuit 44 holds the output signal Vo at high-level.

In FIG. 11, the period from time t7 to time t8 is a period in which the moving object 11 is in the passage position Q2, or in other words, is in front of the first light-receiving element 4a. Because the moving object 11 is in front of only the first light-receiving element 4a, the pulse light from the light-emitting element 3 enters into only the first light-receiving element 4a. The pulse light does not enter into the second light-receiving element 4b. Immediately after the moving object 11 reaches in front of the first light-receiving element 4a, the binary signal PDA of the first comparator 33 is not high-level at least two times in a row, and therefore the output signal SA of the first synchronizing detection circuit 34 is held at low-level. Additionally, because the binary signal PDB of the second comparator 37 is held at low-level, the second synchronizing detection circuit 38 holds the output signal SB at low-level. The holding signal J of the output holding circuit 39 is at low-level. At this time, the output determination circuit 41 holds the output signals K and L at high-level, in accordance with the output signals SA and SB of the first and second synchronizing detection circuits 34 and 38 respectively being low-level. Because the output signals K and L stay at high-level, the output circuit 44 holds the output signal Vo at high-level.

In FIG. 11, the period from time t8 to time t9 is a period in which the moving object 11 is in the passage position Q3, or in other words, is in front of the first and second light-receiving elements 4a and 4b. Because the moving object 11 has moved further and is in front of the first and second light-receiving elements 4a and 4b, the pulse light from the light-emitting element 3 enters into both the first and second light-receiving elements 4a and 4b. For this reason, the binary signals PDA and PDB of the first and second comparators 33 and 37 both become high-level. When the binary signals PDA and PDB of the first and second comparators 33 and 37 are high-level two times in a row, the first and second synchronizing detection circuits 34 and 38 switch their respective output signals SA and SB to high-level. When the output signal SA of the first synchronizing detection circuit 34 switches from low-level to high-level, the output signal SB of the second synchronizing detection circuit 38 is low-level, and the output signal SA of the first synchronizing detection circuit 34 is high-level; however, because the output signal SB of the second synchronizing detection circuit 38 was low-level when the output signal SA of the first synchronizing detection circuit 34 switched from high-level to low-level in the period from time t6 to time t7, the output holding circuit 39 holds the holding signal J at low-level. At this time, because the holding signal J of the output holding circuit 39 is low-level, the output determination circuit 41 holds the output signal K at high-level. In addition, because the output signal K is high-level, the output circuit 44 holds the output signal Vo at high-level.

In FIG. 11, the period from time t9 to time t10 is a period in which the moving object 11 is in the passage position Q4, or in other words, is in front of the second light-receiving element 4b. In this state, the pulse light from the light-emitting element 3 enters into only the second light-receiving element 4b. Immediately after the moving object 11 passes from in front of the first light-receiving element 4a, the binary signal PDA of the first comparator 33 is not low-level at least two times in a row, and therefore the output signal SA of the first synchronizing detection circuit 34 is held at high-level. Because the binary signal PDB is held at a cyclic high-level, the second synchronizing detection circuit 38 holds the output signal SB at high-level. The holding signal J of the output holding circuit 39 stays at low-level. At this time, the output determination circuit 41 holds the output signals K and L at high-level, in accordance with the output signals SA and SB of the first and second synchronizing detection circuits 34 and 38 respectively being high-level. Because the output signals K and L of the output determination circuit 41 are held at high-level, the output circuit 44 holds the output signal Vo at high-level.

In FIG. 11, the period from time t10 to time t11 is a period in which the moving object 11 is in the passage position Q5, or in other words, is immediately after the first and second light-receiving elements 4a and 4b. In this state, the pulse light from the light-emitting element 3 does not enter into the first and second light-receiving elements 4a and 4b, and thus the binary signals PDA and PDB of the first and second comparators 33 and 37 are low-level. When the binary signals PDA and PDB of the first and second comparators 33 and 37 are low-level two times in a row, the first and second synchronizing detection circuits 34 and 38 switch their respective output signals SA and SB to low-level. When the output signal SA of the first synchronizing detection circuit 34 switches from high-level to low-level, the output signal SB of the second synchronizing detection circuit 38 is high-level; therefore, the output holding circuit 39 keeps the holding signal J at low-level. At this time, because the holding signal J is low-level, the output determination circuit 41 holds the output signal K at high-level. In addition, when the output signal SB of the second synchronizing detection circuit 38 switches from high-level to low-level, the output signal SA of the first synchronizing detection circuit 34 is low-level; thus the output determination circuit 41 puts the output signal L at low-level for one pulse. In response to the output signal L becoming low-level, the output circuit 44 switches the output signal Vo from high-level to low-level.

Figure 12:
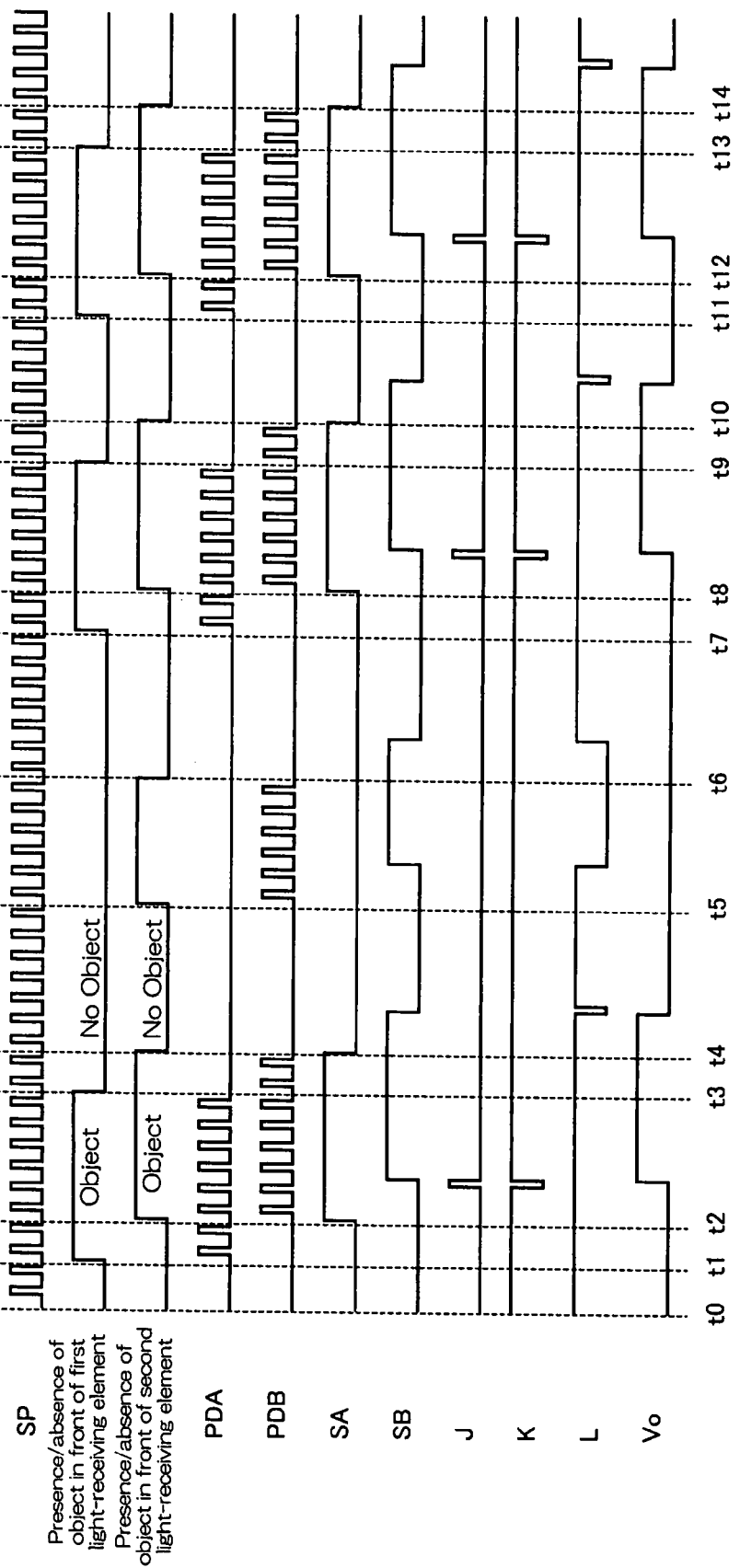
FIG. 12 is a timing chart illustrating operations of a moving object detection photointerrupter when a moving object passes in front of first and second light-receiving elements in the forward direction, rebounds and returns to in front of the second light-receiving element, and then continues on and once again passes through in the forward direction.

Next, referring to the timing chart of FIG. 12, descriptions shall be given regarding operations when a moving object 11 passes in front of the first and second light-receiving elements 4a and 4b in the forward direction D, rebounds at the passage position Q4, and then once again passes through in the forward direction D.

Note that in the same manner as FIG. 8, FIG. 12 shows the pulse-form signal SP; the presence/absence of the moving object 11 in front of the first and second light-receiving elements 4a and 4b; the binary signals PDA and PDB; the output signals SA and SB; the signals K and L; and the output signal Vo.

Additionally, when the moving object 11 passes in front of the first and second light-receiving elements 4a and 4b in the forward direction D, the same operations indicated in time t0 to time t5 in FIG. 8 are carried out; accordingly, descriptions of these operations shall be omitted, and descriptions shall instead be given of the operations from time t5, immediately prior to the next moving object 11 rebounding and returning at the passage position Q4.

In FIG. 12, the period from time t5 to time t6 is a period in which the moving object 11 is in the passage position Q4, or in other words, is in front of the second light-receiving element 4b. Because the moving object 11 rebounds and returns to the passage position Q4 after having passed in front of the first and second light-receiving elements 4a and 4b in the forward direction D, the light pulse from the light-emitting element 3 enters into only the second light-receiving element 4b, and does not enter into the first light-receiving element 4a. For this reason, the binary signal PDA of the first comparator 33 stays at low-level, and the binary signal PDB of the second comparator 37 goes to high-level. The first synchronizing detection circuit 34 holds the output signal SA at low-level. In addition, the second synchronizing detection circuit 38 switches the output signal SB to high-level when the binary signal PDB of the second comparator 37 is high-level two times in a row. Because the output signal SA of the first synchronizing detection circuit 34 stays at low-level, the output holding circuit 39 holds the holding signal J at low-level. In addition, because the holding signal J is low-level, the output determination circuit 41 holds the output signal K at high-level. Also, when the output signal SB of the second synchronizing detection circuit 38 switches from low-level to high-level, the output signal SA of the first synchronizing detection circuit 34 is low-level; thus the output determination circuit 41 determines that the moving object 11 has moved in the reverse direction, and switches the output signal L to low-level. At this time, because the output signal K is high-level and the output signal L is low-level, the output circuit 44 holds the output signal Vo at low-level.

In FIG. 12, the period from time t6 to time t7 is a period in which the moving object 11 is in the passage position Q5, or in other words, is immediately after the first and second light-receiving elements 4a and 4b. If the moving object 11 has once again moved in the forward direction D, the pulse light from the light-emitting element 3 does not enter into the first and second light-receiving elements 4a and 4b, and the binary signals PDA and PDB of the first and second comparators 33 and 37 are low-level. The first synchronizing detection circuit 34 holds the output signal SA at low-level. In addition, the second synchronizing detection circuit 38 switches the output signal SB to low-level when the binary signal PDB of the second comparator 37 is low-level two times in a row. The output holding circuit 39 holds the holding signal J at low-level. In addition, because the holding signal J is low-level, the output determination circuit 41 holds the output signal K at high-level. Also, when the output signal SB of the second synchronizing detection circuit 38 switches from high-level to low-level, the output signal SA of the first synchronizing detection circuit 34 is low-level; thus the output determination circuit 41 switches the output signal L from low-level to high-level. At this time, because the output signals K and L are both high-level, the output circuit 44 holds the output signal Vo at low-level.

In this manner, in the period from time t5 to time t7 shown in FIG. 12, after the moving object 11 passes in front of the first and second light-receiving elements 4a and 4b forward direction D, the moving object 11 rebounds and returns to the passage position Q4, and then once again moves in the forward direction D; however, the output signal Vo is not switched. Through this, even if the moving object 11 that has already passed through rebounds and returns, that moving object 11 is not counted again, and thus errors do not arise in the counting of the moving object 11.

In FIG. 12, from time t7 on, the operations of the period from time t0 to time t5 as shown in FIG. 8 are repeated as long as the moving object 11 passes in front of the first and second light-receiving elements 4a and 4b in the forward direction D, and each time the moving object 11 passes, the output signal Vo of the output circuit 44 becomes high-level.

Figure 13:
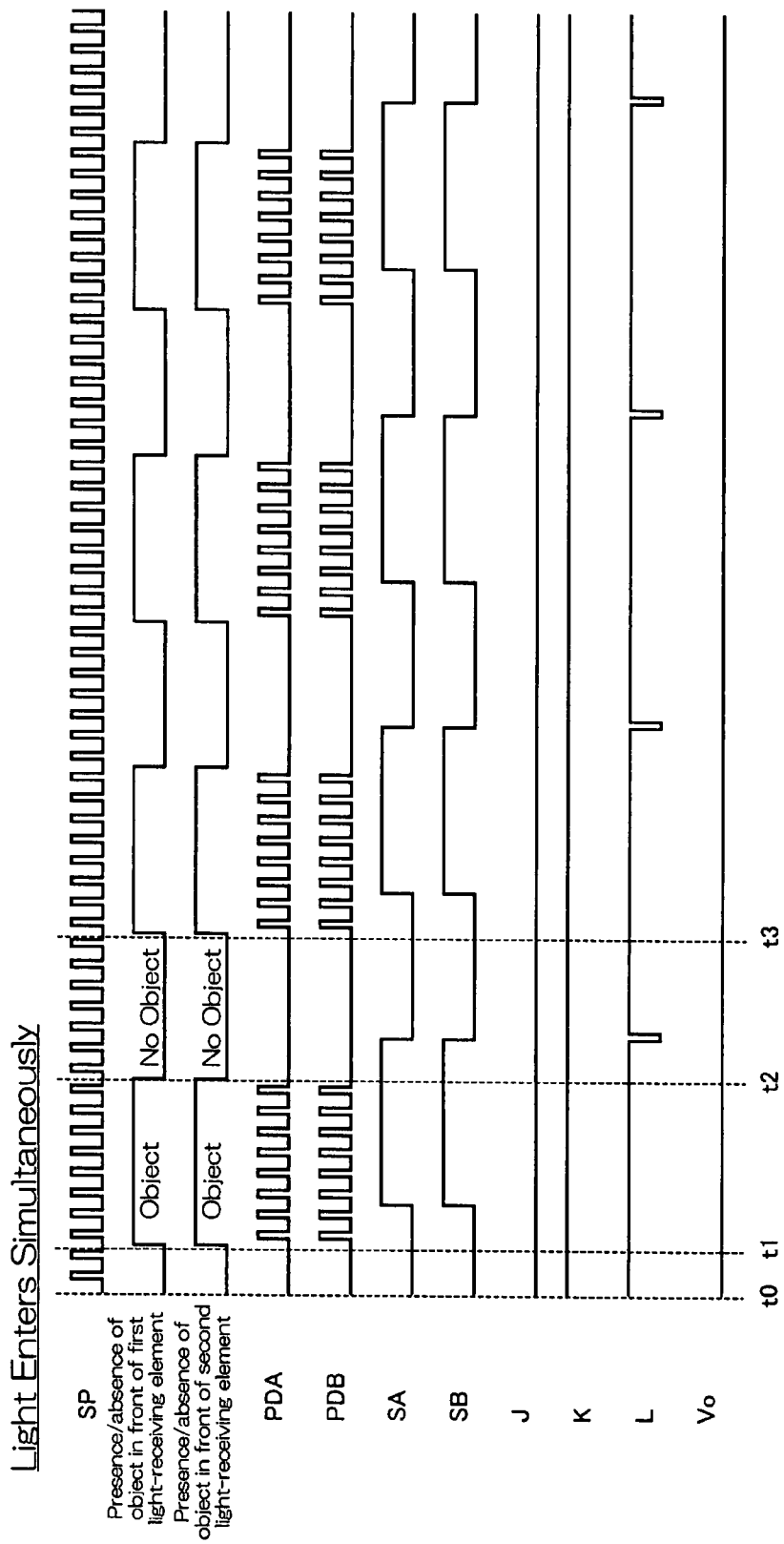
FIG. 13 is a timing chart illustrating operations of a moving object detection photointerrupter when ambient light or light resulting from fraudulent behavior enters the first and second light-receiving elements simultaneously.

Next, referring to the timing chart of FIG. 13, descriptions shall be given regarding operations when ambient light or light resulting from fraudulent behavior enters into the first and second light-receiving elements 4a and 4b simultaneously.

Note that in the same manner as FIG. 8, FIG. 13 shows the pulse-form signal SP; the presence/absence of the moving object 11 in front of the first and second light-receiving elements 4a and 4b; the binary signals PDA and PDB; the output signals SA, SB, K, L, and Vo.

In FIG. 13, in the period from time t1 on, when ambient light or light resulting from fraudulent behavior enters into the first and second light-receiving elements 4a and 4b simultaneously, the binary signals PDA and PDB of the first and second comparators 33 and 37 go to high-level. When the binary signals PDA and PDB of the first and second comparators 33 and 37 are high-level two times in a row, the first and second synchronizing detection circuits 34 and 38 switch their respective output signals SA and SB to high-level. When the output signal SA changes from high-level to low-level, the output signal SB is high-level; therefore, the output holding circuit 39 holds the holding signal J at low-level. In addition, because the holding signal J is low-level, the output determination circuit 41 holds the output signal K at high-level. Also, when the output signal SB of the second synchronizing detection circuit 38 switches from high-level to low-level, the output signal SA of the first synchronizing detection circuit 34 is low-level; thus the output determination circuit 41 puts the output signal L at low-level for one pulse. Because the output signal K is held at high-level, the output circuit 44 holds the output signal Vo at low-level. Through this, the output signal Vo does not go to high-level even if ambient light or light resulting from fraudulent behavior enters, and thus errors do not arise in the counting of the moving object 11.

In this manner, with the moving object detection photointerrupter 1 of the present embodiment, moving objects 11 are sequentially counted as long as the moving objects 11 pass through in the forward direction D; even if an error such as a moving object 11 rebounding occurs, the moving objects 11 can be counted accurately regardless of the distance of this rebound. Furthermore, erroneous operations due to ambient light or light resulting from fraudulent behavior do not occur, and thus accurate counting can be performed in a consistent manner.

Figure 14:
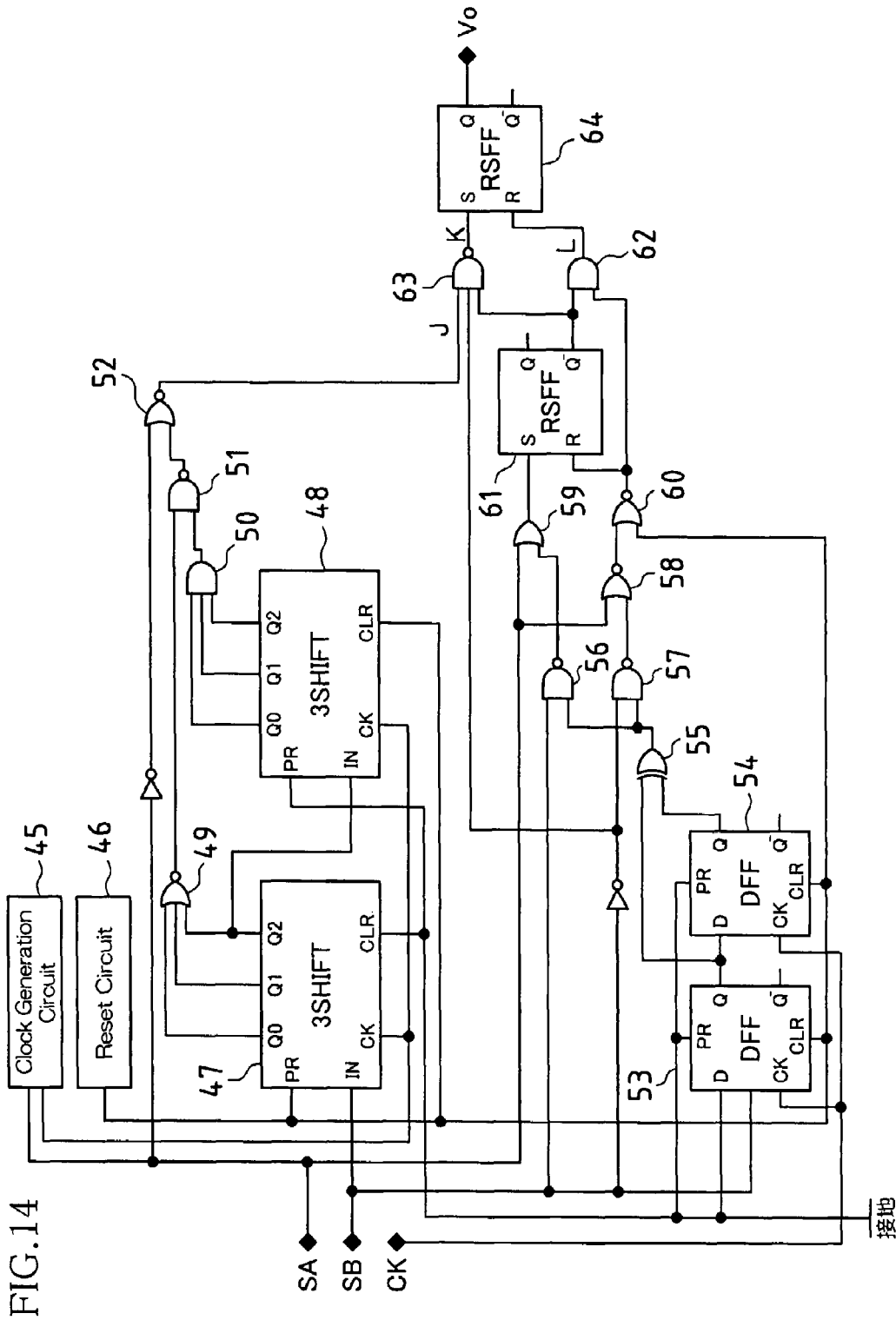
FIG. 14 is a circuit diagram illustrating a detailed configuration of an output holding circuit, and output determination circuit, and an output circuit in the moving object detection photointerrupter of FIG. 6.

FIG. 14 is a circuit diagram illustrating a detailed configuration of the output holding circuit 39, output determination circuit 41, and output circuit 44 of the moving object detection photointerrupter 1 of FIG. 6. Hereinafter, descriptions shall be given regarding the operations of these circuits with reference to the circuit diagram of FIG. 14.

In FIG. 14, the circuits from 47 to 63 correspond to the output determination circuit 41; the circuits from 47 to 53 correspond to the output holding circuit 39; and the circuit 64 corresponds to the output circuit 44.

A reset circuit 46 emits a reset signal when power to the moving object detection photointerrupter 1 is turned on. A clock generation circuit 45 emits a clock pulse two times when the output signal SA of the first synchronizing detection circuit 34 changes from low-level to high-level (rising) or when the output signal SA changes from high-level to low-level (falling).

Two-stage shift registers 47 and 48 hold the signal level of the output signal SB of the second synchronizing detection circuit 38 when the output signal SA of the first synchronizing detection circuit 34 changes from low-level to high-level (rising) or when the output signal SA changes from high-level to low-level (falling). The output of a NOR 52 corresponds to the holding signal J of the output holding circuit 39.

In D flip-flops 53 and 54, an XOR 55, and NANDs 56 and 57, when the output signal SB of the second synchronizing detection circuit 38 changes from low-level to high-level, the output of the NAND 56 goes to low-level, and when the output signal SB changes from high-level to low-level, the output of the NAND 57 goes to low-level for one pulse. The output of a NAND 63 corresponds to the output signal K of the output determination circuit 41, and the output of an AND 62 corresponds to the output signal L of the output determination circuit 41.

Next, descriptions shall be given regarding operations when a moving object 11 passes through in the forward direction D, with reference to the timing chart of FIG. 8.

First, a reset signal is outputted from the reset circuit 46. The two-stage shift register 47 is inputted with the reset signal at PR, and puts all of outputs Q0 to Q2 to high-level. In addition, the two-stage shift register 48 is inputted with the reset signal at CLR, and puts all of outputs Q0 to Q2 to low-level.

During time t2 to time t3, when a moving object 11 passes in front of the first light-receiving element 4a, the output signal SA of the first synchronizing detection circuit 34 changes from low-level to high-level. At this time, a clock pulse is generated and outputted two times by the clock generation circuit 45. The two-stage shift register 47 is inputted with the output signal SB of the second synchronizing detection circuit 38 at an input IN. Because the moving object 11 is in front of only the first light-receiving element 4a, the output signal SB of the second synchronizing detection circuit 38 is low-level. Accordingly, the two-stage shift register 47 sequentially sends out low-level output signals SB due to the two clock pulses, and puts all outputs Q0 to Q2 to low-level. In addition, the two-stage shift register 48 is inputted with the signal from the output Q2 of the two-stage shift register 47 in an input IN, and because the output Q2 is at high-level due to the reset signal, the two-stage shift register 48 sequentially sends out high-level signals due to the two clock pulses, and puts all outputs Q0 to Q2 to high-level.

A NOR 49 is inputted with the outputs Q0 to Q2 of the two-stage shift register 47, and outputs high-level only when Q0 to Q2 are all low-level. An AND 50 is inputted with the outputs Q0 to Q2 of the two-stage shift register 48, and outputs high-level only when Q0 to Q2 are all high-level.

A NAND 51 is inputted with the outputs of the NOR 49 and the AND 50, and outputs low-level only when these outputs are both high-level.

The NOR 52 is inputted with the output of the NAND 51 and an inverted output signal SA of the first synchronizing detection circuit 34, and outputs high-level (the holding signal J) only when both of these signals are low-level.

In other words, in the circuits 47 to 52, high-level (the holding signal J) is outputted by the NOR 52 only when the output signal SA of the first synchronizing detection circuit 34 changes from low-level to high-level, all the outputs Q0 to Q2 of the two-stage shift register 47, which is holding the signal level of the output signal SB of the second synchronizing detection circuit 38, are low-level, and all outputs Q0 to Q2 of the two-stage shift register 48 are high-level.

To explain in accordance with the movement of the moving object 11, when the moving object 11 starts to pass in the forward direction in front of the first light-receiving element 4a, the moving object 11 is not in front of the second light-receiving element 4b (all outputs Q0 to Q2 of the two-stage shift register 47 are low-level). High-level (the holding signal J) is outputted from the NOR 52 only when the moving object 11 has finished passing in the forward direction in front of the first light-receiving element 4a and is in front of the second light-receiving element 4b (all outputs Q0 to Q2 of the two-stage shift register 48 are high-level).

When a moving object 11 passes in front of the second light-receiving element 4b, the output signal SB of the second synchronizing detection circuit 38 changes from low-level to high-level. The output signal SB is inputted into the D flip-flop 53 at D, and when the output signal SB changes from low-level to high-level and the clock is inputted into the D flip-flop 53, an output Q of the D flip-flop 53 goes to high-level. At this time, an output Q of the D flip-flop 54 is low-level; the XOR 55 is inputted with the outputs Q, and outputs high-level for one clock pulse, only when the outputs Q differ from one another. In addition, the NAND 56 is inputted with the output signal SB of the second synchronizing detection circuit 38 and the output of the XOR 55, and outputs low-level only when both of these inputs are high-level. Accordingly, the NAND 56 outputs low-level for one pulse, only when the output signal SB of the second synchronizing detection circuit 38 changes from low-level to high-level (rising).

The NAND 57 is inputted with an inverted output signal SB of the second synchronizing detection circuit 38 and the output of the XOR 55, and outputs low-level only when both of these inputs are high-level. In other words, the NAND 57 outputs low-level for one pulse, only when the output signal SB of the second synchronizing detection circuit 38 changes from high-level to low-level (falling).

An OR 59 is inputted with the output signal SA of the first synchronizing detection circuit 34 and the output of the NAND 56, and thus outputs low-level for one pulse only when both of these inputs are low-level, or in other words, when the output signal SA of the first synchronizing detection circuit 34 is low-level at the time when the output signal SB of the second synchronizing detection circuit 38 is rising (this occurs when the moving object 11 has begun passing in the reverse direction).

A NOR 58 is inputted with the output signal SA of the first synchronizing detection circuit 34 and the output of the NAND 57, and thus outputs high-level for one pulse only when both of these inputs are low-level, or in other words, when the output signal SA of the first synchronizing detection circuit 34 is low-level at the time when the output signal SB of the second synchronizing detection circuit 38 is falling (this occurs when the moving object 11 has finished passing in the forward direction, or when lights due to ambient light or the like enters simultaneously).

A NOR 60 is inputted with the output of the NOR 58 and a signal from the reset circuit 46, and outputs low-level when one of these is high-level. In other words, the NOR 60 outputs low-level for one pulse when reset by the reset circuit 46 or when the moving object 11 has finished passing in the forward direction.

An RS flip-flop 61 is inputted with the output of the OR 59 as a set signal at S, and is inputted with the output of the NOR 60 as a reset signal at R. Therefore, after the output signal SA of the first synchronizing detection circuit 34 goes to low level at the point in time when the output signal SB of the second synchronizing detection circuit 38 is rising (when the moving object 11 has begun to pass in the reverse direction), and the set signal has gone to low-level for one pulse, the RS flip-flop 61 puts an output Q⁻ at low-level until the reset signal goes to low-level.

In addition, when the output signal SA of the first synchronizing detection circuit 34 goes to low level at the point in time when the output signal SB of the second synchronizing detection circuit 38 is falling (when the moving object 11 has finished passing in the forward direction), and reset signal goes to low-level for one pulse, the RS flip-flop 61 puts the output Q⁻ at high-level.

The AND 62 is inputted with the output Q⁻ of the RS flip-flop 61 and the output of the NOR 60, and outputs low-level (the output signal L) when one of these is low-level. In other words, in the case where the moving object 11 has begun passing in the reverse direction, the AND 62 outputs low-level until the moving object 11 has finished passing in the forward direction, or outputs low-level for one pulse in the case where the moving object 11 has finished passing in the forward direction.

The NAND 63 is inputted with the output of the NOR 52 (the holding signal J), an inverted output signal SB of the second synchronizing detection circuit 38, and the output Q⁻ of the RS flip-flop 61, and outputs low-level (the output signal K) only when these inputs are all high-level. In other words, the NAND 63 outputs low-level (the output signal K) when the previous moving object 11 has finished passing in the forward direction and the present moving object 11 has begun passing in the forward direction.

An RS flip-flop 64 is inputted with the output of the NAND 63 (the output signal K) as a set signal at S, and is inputted with the output of the AND 62 (the output signal L) as a reset signal at R. Therefore, the previous moving object 11 has finished passing in the forward direction, the present moving object 11 has begun passing in the forward direction, the output signal SB of the second synchronizing detection circuit 38 goes to low-level, the output of the NAND 63 (the output signal K) goes to low-level, and the set signal of the RS flip-flop 64 goes to low-level; at this time, the output Q of the RS flip-flop 64 (the output signal Vo) goes to high-level.

Then, when the output signal SB of the second synchronizing detection circuit 38 goes to high-level, the output of the NAND 63 (the output signal K) goes to high-level, and the set signal to the RS flip-flop 64 goes to high-level. Furthermore, when the moving object 11 has finished moving in the forward direction, the AND 62 outputs low-level (the output signal L) for one pulse, the reset signal to the RS flip-flop 64 goes to low-level, and the output Q of the RS flip-flop 64 (the output signal Vo) goes to low-level.

Next, descriptions shall be given regarding operations when a moving object 11 rebounds after the time t5 and then passes in front of the first and second light-receiving elements 4a and 4b in the reverse direction, with reference to the timing chart of FIG. 9.

In the case where the moving object 11 moves in the reverse direction, first, the moving object 11 begins passing in front of the second light-receiving element 4b. When the output signal SB of the second synchronizing detection circuit 38 changes from low-level to high-level, the output signal SA of the first synchronizing detection circuit 34 is low-level, and thus the OR 59 outputs low-level for one pulse, and the output Q⁻ of the RS flip-flop 61 goes to low-level. Therefore, the output of the AND 62 (the output signal L) goes to low-level for one pulse, and because the reset signal of the RS flip-flop 64 goes to low-level, the output Q of the RS flip-flop 64 (the output signal Vo) stays at low-level.

Additionally, when the moving object 11 passes in front of the second light-receiving element 4b and begins passing in front of the first light-receiving element 4a, two clock pulses are generated and outputted by the clock generation circuit 45, and the signals are sequentially sent to the two-stage shift registers 47 and 48. At this time, the two-stage shift register 47 is inputted with the output signal SB of the second synchronizing detection circuit 38 at an input IN, and therefore all outputs Q0 to Q2 of the two-stage shift register 47 go to high-level. Additionally, all outputs Q0 to Q2 of the two-stage shift register 48 also go to high-level. Therefore, the output of the NOR 49 goes to low-level, and the output of the AND 50 goes to high-level; for this reason, the output of the NAND 51 goes to high-level, and the output of the NOR 52 goes to low-level. Accordingly, because the output of the NAND 63 (the output signal K) goes to high-level, the set signal of the RS flip-flop 64 goes to high-level, the RS flip-flop 64 is not set, and thus the output Q (the output signal Vo) is not switched to high-level, and stays at low-level.

The output of the AND 62 (the output signal L) is held at low-level until the moving object 11 finishes passing in the forward direction. For this reason, the RS flip-flop 64 continues to be reset until the moving object 11 finishes passing in the forward direction. In other words, the RS flip-flop 64 continues to be reset until the moving object 11 has finished passing in the forward direction after having passed in the reverse direction, and the RS flip-flop 64 stops being reset after the moving object 11 has finished passing in the forward direction. For this reason, the output Q of the RS flip-flop 64 (the output signal Vo) is switched to high-level when the next moving object 11 passes in the forward direction.

Next, descriptions shall be given regarding operations when a moving object 11 rebounds at the passage position Q3 after the time t5 and then once again passes in the forward direction D, with reference to the timing chart of FIG. 10.

When the moving object 11 passes in front of the first light-receiving element 4a, the output signal SA of the first synchronizing detection circuit 34 changes from low-level to high-level. At this time, in the circuits 47 to 52, high-level (the holding signal J) is outputted by the NOR 52 because the output signal SA of the first synchronizing detection circuit 34 changes from low-level to high-level, all the outputs Q0 to Q2 of the two-stage shift register 47, which is holding the signal level of the output signal SB of the second synchronizing detection circuit 38, are low-level, and all outputs Q0 to Q2 of the two-stage shift register 48 are high-level.

To explain in accordance with the movement of the moving object 11, when the moving object 11 starts to pass in the forward direction in front of the first light-receiving element 4a, the moving object 11 is not in front of the second light-receiving element 4b (all outputs Q0 to Q2 of the two-stage shift register 47 are low-level). High-level (the holding signal J) is outputted from the NOR 52 only when the moving object 11 has finished passing in the forward direction in front of the first light-receiving element 4a and is in front of the second light-receiving element 4b (all outputs Q0 to Q2 of the two-stage shift register 48 are high-level).

When the moving object 11 is in front of the second light-receiving element 4b, the output signal SB of the second synchronizing detection circuit 38 changes from low-level to high-level. At this time, the OR 59 outputs high-level, and thus the RS flip-flop 61 is not set, and the output Q⁻ of the RS flip-flop 61 is high-level. Because the output of the NOR 52 is high-level, the NAND 63 outputs low-level (the output signal K) until the output signal SB of the second synchronizing detection circuit 38 goes to high-level. Accordingly, the RS flip-flop 64 is set, and the output Q of the RS flip-flop 64 (the output signal Vo) is switched to high-level.

Next, when the moving object 11 rebounds and returns from the second light-receiving element 4b, the output signal SB of the second synchronizing detection circuit 38 changes from high-level to low-level. When the output signal SB of the second synchronizing detection circuit 38 switches from high-level to low-level, the output signal SA of the first synchronizing detection circuit 34 is high-level; therefore, the NOR 58 outputs low-level. Because of this, the output of the NOR 60 goes to high-level and the output of the AND 62 (the output signal L) goes to high-level, and thus the RS flip-flop 64 is not reset, and the output Q of the RS flip-flop 64 (the output signal Vo) goes to high-level.

In the period from time t8 to time t9, when the output signal SA of the first synchronizing detection circuit 34 switches from high-level to low-level, all outputs Q0 to Q2 of the two-stage shift register 47 go to low-level, and all outputs Q0 to Q2 of the two-stage shift register 48 go to low-level; thus the output of the NOR 52 is held at low-level. Accordingly, the output Q of the RS flip-flop 64 (the output signal Vo) undergoes no change and is held at high-level.

In the period from time t9 to time t10, the output signals SA and SB of the first and second synchronizing detection circuits 34 and 38 undergo no change, and thus the other output signals also undergo no change.

In the period from time t10 to time t11, when the output signal SA of the first synchronizing detection circuit 34 switches from high-level to low-level, the output signal SB of the second synchronizing detection circuit 38 is low-level; therefore, all outputs Q0 to Q2 of the two-stage shift register 47 go to low-level, all outputs Q0 to Q2 of the two-stage shift register 48 also go to low-level, and thus the output of the NOR 52 is low-level and the RS flip-flop 64 in not set.

When the output signal SB of the second synchronizing detection circuit 38 switches from low-level to high-level, the output signal SA of the first synchronizing detection circuit 34 is high-level; therefore, the output of the OR 59 goes to high-level, the RS flip-flop 61 is not set, and the output Q⁻ of the RS flip-flop 61 is held at high-level. Accordingly, the RS flip-flop 64 is not reset, and the output Q of the RS flip-flop 64 (the output signal Vo) is held at high-level.

In the period from time t11 to time t12, the output signals SA and SB of the first and second synchronizing detection circuits 34 and 38 undergo no change, and thus the other output signals also undergo no change.

In the period from time t12 to time t13, when the output signal SA of the first synchronizing detection circuit 34 switches from high-level to low-level, the output signal SB of the second synchronizing detection circuit 38 is high-level; therefore, all outputs Q0 to Q2 of the two-stage shift register 47 go to high-level, all outputs Q0 to Q2 of the two-stage shift register 48 go to low-level, the output of the NOR 52 goes to low-level, the output of the NAND 63 (the output signal K) is held at high-level, and the RS flip-flop 64 is not set.

When the output signal SB of the second synchronizing detection circuit 38 switches from high-level to low-level, the output signal SA of the first synchronizing detection circuit 34 is low-level; therefore, the NOR 58 outputs high-level for one pulse, and the output of the NOR 60 goes to low-level. Therefore, the output of the AND 62 (the output signal L) goes to low-level for one pulse, the RS flip-flop 64 is set, and the output Q (the output signal Vo) switches from high-level to low-level.

From time t13 on, the output signal Vo goes to high-level each time a moving object 11 moves in the forward direction D, in the same manner as with time t0 to t5.

Next, descriptions shall be given regarding operations when a moving object 11 rebounds at the passage position Q2 after the time t5 and then once again passes in the forward direction D, with reference to the timing chart of FIG. 11.

When a moving object 11 reaches in front of the first light-receiving element 4a, the output signal SA of the first synchronizing detection circuit 34 changes from low-level to high-level. At this time, in the circuits 47 to 52, high-level is outputted by the NOR 52 because the output signal SA of the first synchronizing detection circuit 34 changes from low-level to high-level, all the outputs Q0 to Q2 of the two-stage shift register 47, which is holding the signal level of the output signal SB of the second synchronizing detection circuit 38, are low-level, and all outputs Q0 to Q2 of the two-stage shift register 48 are high-level. Accordingly, until the output signal SB of the second synchronizing detection circuit 38 goes to high-level, the NAND 63 outputs low-level (the output signal K), the RS flip-flop 64 is reset, and the output Q of the RS flip-flop 64 (the output signal Vo) goes to high-level.

In the period from time t6 to time t7, because the output signal SB of the second synchronizing detection circuit 38 undergoes no change, the output of the AND 62 (the output signal L) is held at high-level, and the output Q of the RS flip-flop 64 (the output signal Vo) is held at high-level.

In the period from time t7 to time t8, the output signals of the first and second synchronizing detection circuits undergo no change, and thus the other output signals also undergo no change.

In the period from time t8 to time t9, when the output signal SA of the first synchronizing detection circuit 34 changes from low-level to high-level, the output signal SB of the second synchronizing detection circuit 38 is low-level; therefore, all outputs Q0 to Q2 of the two-stage shift register 47 go to low-level, all outputs Q0 to Q2 of the two-stage shift register 48 go to low-level, and thus the output of the NOR 52 is low-level and the RS flip-flop 64 in not set.

In addition, when the output signal SB of the second synchronizing detection circuit 38 switches from low-level to high-level, the output signal SA of the first synchronizing detection circuit 34 is high-level; therefore, the output of the OR 59 goes to high-level, the RS flip-flop 61 is not set, and the output Q⁻ of the RS flip-flop 61 is held at high-level. Accordingly, the RS flip-flop 64 is not reset, and the output Q of the RS flip-flop 64 (the output signal Vo) is held at high-level.

In the period from time t9 to time t10, the output signals SA and SB of the first and second synchronizing detection circuits 34 and 38 undergo no change, and thus the other signals also undergo no change.

In the period from time t10 to time t11, when the output signal SA of the first synchronizing detection circuit 34 switches from high-level to low-level, the output signal SB of the second synchronizing detection circuit 38 is high-level; therefore, all outputs Q0 to Q2 of the two-stage shift register 47 go to high-level, all outputs Q0 to Q2 of the two-stage shift register 48 go to low-level, the output of the NOR 52 goes to low-level, the output of the NAND 63 (the output signal K) is held at high-level, and the RS flip-flop 64 is not set.

Then, when the output signal SB of the second synchronizing detection circuit 38 switches from high-level to low-level, the output signal SA of the first synchronizing detection circuit 34 is low-level; therefore, the NOR 58 outputs high-level for one pulse, and the output of the NOR 60 goes to low-level. Therefore, the output of the AND 62 (the output signal L) also goes to low-level for one pulse, the RS flip-flop 64 is reset, and the output Q of the RS flip-flop 64 (the output signal Vo) is switched from high-level to low-level.

From time t11 on, the output signal Vo goes to high-level each time a moving object 11 moves in the forward direction D, in the same manner as with time t0 to t5.

Next, descriptions shall be given regarding operations when a moving object 11 rebounds at the passage position Q4 after the time t5 and then once again passes in the forward direction D, with reference to the timing chart of FIG. 12.

In the period from time t5 to time t6, the moving object 11 does not pass in front of the first light-receiving element 4a, and thus the output signal SA of the first synchronizing detection circuit 34 undergoes no change. For this reason, NOR 52 is held at low-level. Accordingly, the output of the NAND 63 (the output signal K) is held at high-level, the RS flip-flop 64 is not set, and the output Q of the RS flip-flop 64 (the output signal Vo) is held at low-level.

When the output signal SB of the second synchronizing detection circuit 38 switches from low-level to high-level, the output signal SA of the first synchronizing detection circuit 34 is low-level; thus the moving object 11 can be considered to have begin passing in the reverse direction. At this time, the output of the OR 59 goes to low-level, the RS flip-flop 61 is set, and the output Q⁻ of the RS flip-flop 61 goes to low-level. Therefore, the output of the AND 62 (the output signal L) goes to low-level, the RS flip-flop 64 is reset, and the output Q of the RS flip-flop 64 (the output signal Vo) is held at low-level.

In the period from time t6 to time t7, when the output signal SB of the second synchronizing detection circuit 38 switches from high-level to low-level, the output signal SA of the first synchronizing detection circuit 34 is low-level; therefore, the moving object 11 can be considered to have finished passing in the forward direction, and the output of the NOR 60 goes to low-level, the RS flip-flop 61 is reset, and the output Q⁻ of the RS flip-flop 61 goes to high-level. Therefore, the output of the AND 62 (the output signal L) goes to high-level, the RS flip-flop 64 is set, and the output Q of the RS flip-flop 64 (the output signal Vo) is held at low-level.

From time t7 on, the output signal Vo goes to high-level each time a moving object 11 moves in the forward direction D, in the same manner as with time t0 to t5.

Next, referring to the timing chart of FIG. 13, descriptions shall be given regarding operations when ambient light or light resulting from fraudulent behavior enters into the first and second light-receiving elements 4a and 4b simultaneously.

When the output signal SA of the first synchronizing detection circuit 34 switches from low-level to high-level, the output signal SB of the second synchronizing detection circuit 38 is high-level; therefore, all outputs Q0 to Q2 of the two-stage shift register 47 go to high-level, all outputs Q0 to Q2 of the two-stage shift register 48 go to high-level, the output of the NOR 52 is held at low-level, the output of the NAND 63 (the output signal K) is held at high-level, the RS flip-flop 64 is not set, and the output Q of the RS flip-flop 64 (the output signal Vo) is held at low-level.

In addition, when the output signal SB of the second synchronizing detection circuit 38 switches from low-level to high-level, the output signal SA of the first synchronizing detection circuit 34 is low-level; therefore, the output of the OR 59 goes to low-level. Therefore, the output $\overline{Q}$ of the RS flip-flop 61 goes to high-level, the output of the AND 62 (the output signal L) goes to high-level, the RS flip-flop 64 is not reset, and the output Q of the RS flip-flop 64 (the output signal Vo) is held at low-level.

In this manner, the RS flip-flop 64 is not set, and thus the output Q (the output signal Vo) is held at low-level, in the case where lights enter simultaneously.

It should be noted that the present invention is not limited to the aforementioned embodiment, and many variations can be made thereon. For example, various types of elements can be applied as the light-emitting elements and the light-receiving elements. Furthermore, a single light-emitting element and a single light-receiving element may make up a single set, with the light emitted from the light-emitting element being received by the light-receiving element, and plural sets of light-emitting elements and light-receiving element may be disposed at intervals in the passing direction of the moving object.

Furthermore, the present invention can be applied not only in a reflective type photointerrupter, such as the moving object detection photointerrupter 1, but can also be applied in a transmissive type photointerrupter. In the case of a transmissive type photointerrupter, when a moving object is in front of a light-receiving element, light does not enter into that light-receiving element, and when a moving object is not in front of a light-receiving element, light enters into that light-receiving element; thus, compared to a reflective type photointerrupter, the high-level and low-level of the detection output of the light-receiving elements are inverted.

In addition, the scope of the present invention includes not only a moving object detection photointerrupter but also an electric device in which the moving object detection photointerrupter is applied. Office automation machines such as copying machines, factory automation machines, general household appliances, and the like can given as examples of such an electronic device.

Note that the present invention may be embodied in other forms without departing from the spirit or essential characteristics thereof. Accordingly, the embodiments disclosed in this application are to be considered in all respects as illustrative and not limiting. The scope of the invention is indicated by the appended claims rather than by the foregoing description. Furthermore, all changes which come within the meaning and range of equivalency of the claims are intended to be embraced therein.

What is claimed is:

1. A moving object detection photointerrupter that sequentially detects the passing of a plurality of moving objects, the photointerrupter comprising:
   at least one light-emitting portion that emits light;
   a plurality of light-receiving portions, disposed at intervals in the passing direction of the moving object, that receive and detect light emitted from the light-emitting portion and reflected by the moving object;
   a holding portion that holds information indicating the passing direction of the moving object corresponding to a change in the detection outputs of the light-receiving portions occurring when the light-receiving portions receive the light reflected by the moving object; and
   a determination portion that determines the passing of the moving object based on the passing direction of the moving object as held by the holding portion and the detection outputs of the light-receiving portions occurring when the light-receiving portions receive the light reflected by the next moving object.

2. The moving object detection photointerrupter according to claim 1,
   wherein when the passing direction of the moving object as held by the holding portion is the forward direction, and the passing direction of the next moving object corresponding to the detection outputs of the light-receiving portions is the forward direction, the determination portion determines that the next moving object has passed.

3. The moving object detection photointerrupter according to claim 1,
   wherein when the passing direction of the moving object as held by the holding portion is the reverse direction, the determination portion determines that the moving object has not passed.

4. The moving object detection photointerrupter according to claim 1,
   wherein when the passing direction of the moving object as held by the holding portion is the reverse direction, the determination portion determines that the next moving object has not passed, even if the passing direction of the next moving object corresponding to a change in the detection outputs of the light-receiving portions is the forward direction.

5. The moving object detection photointerrupter according to claim 1,
   wherein when the moving object has been detected by the light-receiving portion on the exit side of the forward direction and has not been detected by the light-receiving portion on the entry side, the determination portion determines that the moving object has not passed, and outputs an error signal or holds the signal indicating the determination.

6. The moving object detection photointerrupter according to claim 1,
   wherein when the moving object has been detected by the light-receiving portion on the entry side of the forward direction and has not been detected by the light-receiving portion on the exit side, the holding portion holds the forward direction as the passing direction of the moving object, and
   when the passing direction of the moving object as held by the holding portion is the forward direction, and the passing direction of the next moving object corresponding to a change in the detection outputs of the light-receiving portions is the forward direction, the determination portion determines that the next moving object has passed.

7. The moving object detection photointerrupter according to claim 1,
wherein when the outputs of the light reception performed by the light-receiving portions change simultaneously, the determination portion outputs an error signal or holds the signal indicating the determination.

8. The moving object detection photointerrupter according to claim 7,
wherein after outputting an error signal or holding the signal indicating the determination, the determination portion stops the output of the error signal when the passing direction of the moving object corresponding to a change in the detection outputs of the light-receiving portions becomes the forward direction.

9. The moving object detection photointerrupter according to claim 1, further comprising:
a synchronization detection portion that validates the detection outputs of the light-receiving portions when the light emission timing of the light-emitting portion and the light receiving timing of the light-receiving portions match plural times in a row.

10. The moving object detection photointerrupter according to claim 9,
wherein the synchronization detection portion invalidates the detection outputs of the light-receiving portions when the light emission timing of the light-emitting portion and the light receiving timing of the light-receiving portions do not match.

11. The moving object detection photointerrupter according to claim 1,
wherein there is only one light-emitting portion, and
the light-receiving portions receive the light from the light-emitting portion together.

12. An electric device using the moving object detection photointerrupter according to claim 1.

* * * * *